United States Patent [19]
Watanabe et al.

[11] Patent Number: 5,343,454
[45] Date of Patent: Aug. 30, 1994

[54] TRACKING CONTROL APPARATUS FOR CORRECTING TRACKING ERROR SIGNAL ACCORDING TO APPROXIMATE EQUATION OF A FUNCTION OF TRACK ADDRESS

[75] Inventors: Katsuya Watanabe, Suita; Masayuki Shibano, Izumisano; Hiroyuki Yamaguchi; Yasuaki Edahiro, both of Hirakata; Mitsuro Moriya, Ikomo, all of Japan

[73] Assignee: Matsushita Electric Industrial Co., Ltd., Osaka, Japan

[21] Appl. No.: 980,560

[22] Filed: Nov. 23, 1992

[30] Foreign Application Priority Data

Nov. 22, 1991 [JP] Japan ................... 3-307347
Dec. 9, 1991 [JP] Japan ................... 3-324431

[51] Int. Cl.⁵ ............................................. G11B 7/00
[52] U.S. Cl. .................... 369/44.32; 369/44.28; 369/44.29; 369/44.35
[58] Field of Search ............. 369/44.28, 44.35, 44.25, 369/44.29, 44.27, 44.32, 44.33; 360/77.01, 75, 77.07, 77.06, 77.11, 78.07

[56] References Cited

U.S. PATENT DOCUMENTS

| | | | |
|---|---|---|---|
| 4,205,338 | 5/1980 | Schaefer | 360/77.04 |
| 4,807,210 | 2/1989 | Kaku et al. | 369/109 |
| 5,048,002 | 9/1991 | Horie et al. | 369/44.35 |
| 5,050,151 | 9/1991 | Kurz | 369/44.29 |

FOREIGN PATENT DOCUMENTS 4-58658  4/1985  Japan .
2-285526 11/1990 Japan .
3-154233  7/1991  Japan .

Primary Examiner—Aristotelis Psitos
Assistant Examiner—P. W. Huber
Attorney, Agent, or Firm—Wenderoth, Lind & Ponack

[57] ABSTRACT

In a tracking control apparatus, a tracking error signal having a level of a positional shift of a beam of light projected through an optical head onto a recording medium is detected based on a reflected light from the recording medium, and the optical head is controlled so that a beam of light scans on the track to be recorded or reproduced based on the tracking error signal. Offset values of the tracking error signal on adjustment tracks which are predetermined among a plurality of tracks of the recording medium are detected, and then coefficients of a predetermined approximate equation approximately representing an offset value characteristic on the track based on the detected offset values are calculated. Further, an offset value corresponding to the track to be recorded or reproduced is calculated based on the first approximate equation with the calculated coefficients, and an offset value of the tracking error signal is corrected based on the calculated offset value.

17 Claims, 20 Drawing Sheets

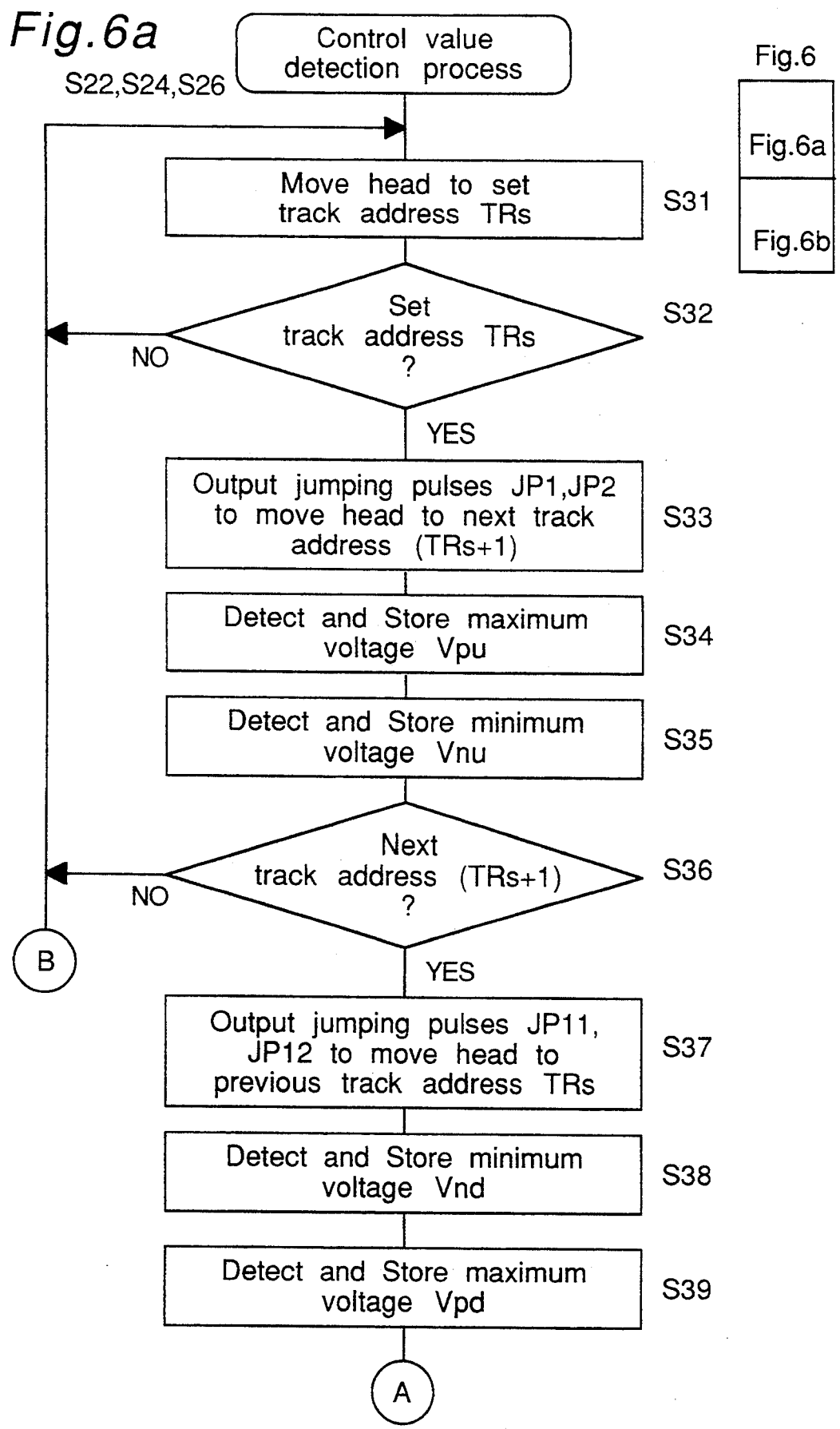

TRACKING CONTROL APPARATUS FOR CORRECTING TRACKING ERROR SIGNAL ACCORDING TO APPROXIMATE EQUATION OF A FUNCTION OF TRACK ADDRESS

BACKGROUND OF THE INVENTION

1. Field of the Invention

The present invention relates to a tracking control apparatus for an optical recording and reproducing apparatus for recording information data into a disk-shaped recording medium such as an optical disk, a magneto-optical disk or the like and for reproducing the recorded information data therefrom, and more particularly, to a tracking control apparatus for controlling a beam of light projecting from a light source such as a semiconductor laser onto a recording medium so that the beam of light scans on a track to be recorded or reproduced by correcting a tracking error signal according to an approximate equation of a function of a track address of the recording medium.

2. Description of the Related Art

Conventionally, there has been manufactured and publicly known, an optical recording and reproducing apparatus for focusing a beam of light modulated according to information data from a light source such as a semiconductor laser or the like, projecting the beam of light onto a disk-shaped recording medium rotating with a predetermined number of rotations per second, thereby recording the information data into the recording medium, and reproducing the recorded information data from the disk-shaped recording medium. In the disk-shaped recording medium of this type, there are formed minute tracks having a width of 0.6 μm with a pitch of 1.5 μm in the shape of a spiral or in concentric circles. In order to record an information data signal on the track of the recording medium or to reproduce the signal recorded on the track, a focus control is performed so that a beam of light is projected onto the recording medium in a predetermined focus state, and further, a tracking control is performed so that a beam of light scans precisely on the track.

Conventionally, the tracking control apparatus comprises:

(a) a photo-detector for detecting a reflected light from the recording medium or a transmission light which has transmitted through the recording medium, thereby generating a tracking error signal which changes depending on a positional relationship between a beam of light projected onto the recording medium and the track;

(b) an actuator for moving an optical head including a focus lens for focusing and projecting a beam of light onto the recording medium in a direction approximately perpendicular to a tangent line of the track; and (c) a control circuit for driving the actuator based on the tracking error signal detected by the photodetector, and for performing a tracking control process so that a beam of light scans precisely on the track of the recording medium.

When an offset is generated in the tracking control apparatus due to, for example, a positional shift of the beam of light caused by an error in adjusting the optical head or stray light from the semiconductor laser or the like, a beam of light scans on a position slightly shifted from the center of the track. This leads to not only deterioration of the quality of the recording signal and the reproducing signal but also to lowering of the performance of pulling into a correct tracking control state since the above-mentioned tracking error signal is outputted asymmetrically with respect to a DC level thereof. In this case, a stable start and a stable retrieval can not be obtained in the tracking control apparatus.

Therefore, in order to establish a high reliability in the tracking control apparatus, it is necessary to adjust an offset of the tracking control apparatus. Conventionally, precise adjustment using a variable resistor for changing the offset value or the DC level of the tracking error signal requires much time in a process for manufacturing the recording and reproducing apparatus.

Recently, there has been suggested an automatic offset adjusting method for use in the tracking control apparatus of this type, using a microcomputer or a digital signal processor (DSP). The conventional automatic offset adjusting method includes a step of detecting an offset of the tracking control apparatus upon turning on the apparatus; and a step of correcting the offset so that the tracking control apparatus operates in an optimum tracking state.

For example, the automatic offset adjusting method of this type is described in Japanese Patent Laid-open Publication No. 1-128237. The published method includes a step of detecting an average value of a sinusoidal tracking error signal which is outputted when a beam of light crosses the track of the recording medium, and a step of applying a voltage over the tracking error signal so that the average value becomes a target value of the tracking control apparatus.

However, in the cases of adjusting the tracking control apparatus using the conventional methods, since an offset value of the tracking error signal is measured in only one region of the disk-shaped recording medium, when the offset value changes in the radial direction of the disk-shaped recording medium in the tracking control apparatus due to, for example, an inclination error caused when a direction in which a shaft moves the optical head is slightly inclined from a direction perpendicular to a tangent line of the track, or a disk tilt caused when a pair of disks are boned on each other or when a hubcap is mounted on the disk-shaped recording disk or the like, the effects of adjusting the tracking control apparatus are lowered.

Further, in a partial ROM optical disk comprising a ROM area and a re-writable RAM area which are formed so as to be divided in a radial direction of a disk-shaped magneto-optical disk, change rates in the amplitude of the tracking error signal change depending on the ROM and RAM areas due to the presence and non-presence of prepits. For example, when a beam of light is moved from the ROM area through a boundary area between the ROM and RAM areas to the RAM area and vice versa, the amplitude of the generated tracking error signal significantly changes depending on respective tracks of the ROM and RAM areas. Therefore, it is impossible to precisely detect the maximum and minimum values of the tracking error signal, and the preciseness of adjusting the tracking control apparatus is significantly lowered. In this case, a pulling-in operation into the tracking becomes unstable after retrieving a destination track to be recorded or reproduced, and the preciseness of retrieving the destination track becomes significantly lowered. Further, since the tracking control is performed so that a beam of light is slightly shifted from the center of a track, when a signal is recorded or reproduced in such a state, the quality of the recorded or reproduced signal becomes lowered, resulting in a low reliability of the tracking control apparatus.

SUMMARY OF THE INVENTION

An object of the present invention is therefore to provide a tracking control apparatus capable of detecting and precisely correcting an offset value of a tracking error signal which may be changed due to an adjustment error in positioning an optical head, a dispersion of disks, a secular change, a difference between circumferences of inner and outer regions of a disk-shaped recording medium, or the like, thereby correctly recording an information signal into the recording medium and reproducing the recorded information signal therefrom with a higher reliability.

Another object of the present invention is to provide a tracking control apparatus capable of detecting and precisely correcting an offset value of a tracking error signal which may be changed due to a difference between ROM and RAM areas or the like, thereby correctly recording an information signal into the recording medium and reproducing the recorded information signal therefrom with a higher reliability.

A further object of the present invention is to provide a tracking control apparatus capable of detecting and precisely correcting an amplitude value of a tracking error signal which may be changed due to an adjustment error in positioning an optical head, a dispersion of disks, a secular change, a difference between circumferences of inner and outer regions of a disk-shaped recording medium or the like, thereby correctly recording an information signal into the recording medium and reproducing the recorded information signal therefrom with a higher reliability.

A still further object of the present invention is to provide a tracking control apparatus capable of detecting and precisely correcting an amplitude value of a tracking error signal which may be changed due to a difference between ROM and RAM areas or the like, thereby correctly recording an information signal into the recording medium and reproducing the recorded information signal therefrom with a higher reliability.

In order to achieve the aforementioned objective, according to one aspect of the present invention, there is provided a tracking control apparatus comprising:

light source means for generating and projecting a beam of light through an optical head onto a disk-shaped recording medium in which a plurality of tracks to be recorded or reproduced are formed in a shape of spiral circle or concentric circles;

optical detecting means for detecting a reflected light from said recording medium;

tracking error detecting means for detecting a positional shift of a beam of light projected onto said recording medium from a track to be recorded or reproduced based on said reflected light detected by said optical detecting means, and for generating a tracking error signal having a level of said detected positional shift;

tracking control means for controlling said optical head so that said beam of light scans on said track to be recorded or reproduced based on said tracking error signal generated by said tracking error detecting means;

offset detecting direct current means for detecting offset values of said tracking error signal on adjustment tracks predetermined among a plurality of tracks of said recording medium;

first approximate function calculating means for calculating coefficients of a predetermined first approximate equation approximately representing an offset value characteristic on said track of said recording medium based on said offset values detected by said offset detecting means;

offset value calculating means for calculating a direct current offset value corresponding to said track to be recorded or reproduced based on said first approximate equation with said calculated coefficients; and offset value correcting means for correcting an offset value of said tracking error signal based on said offset value calculated by said offset value calculating means.

According to another aspect to the present invention, the above-mentioned tracking control apparatus further comprises:

amplitude detecting means for detecting amplitude values of said tracking error signal on adjustment tracks predetermined among a plurality of tracks of said recording medium;

second approximate function calculating means for calculating coefficients of a predetermined second approximate equation approximately representing an amplitude value characteristic on said track of said recording medium based on said amplitude values detected by said amplitude detecting means;

amplitude value calculating means for calculating an amplitude value corresponding to said track to be recorded or reproduced based on said second approximate equation with said calculated coefficients; and amplitude value correcting means for correcting the amplitude of said tracking error signal based on said amplitude value calculated by said amplitude value calculating means.

In the above-mentioned tracking control apparatus, said offset detecting means comprises:

first jumping pulse generating means for sequentially generating and outputting to said tracking control means, a first pair of jumping pulses for jumping said track from an adjustment track to the next track of said adjustment track;

first signal detecting means for sequentially detecting maximum and minimum levels of said tracking error signal generated by said tracking error detecting means, respectively, when said first jumping pulse generating means outputs said first pair of jumping pulses;

second jumping pulse generating means for sequentially generating and outputting to said tracking control means, a second pair of jumping pulses for jumping said track from said next track to said adjustment track;

second signal detecting means for sequentially detecting minimum and maximum levels of said tracking error signal generated by said tracking error detecting means, respectively, when said second jumping pulse generating means outputs said second pair of jumping pulses; and offset average calculating means for calculating an average value of an offset value of said tracking error signal on said adjustment track based on said maximum and minimum levels detected by said first signal detecting means and said minimum and maximum levels detected by said second signal detecting means, and for setting said calculated average value as said offset value.

In the above-mentioned tracking control apparatus, said offset detecting means further comprises repeating means for controlling said first jumping pulse generating means, said first signal detecting means, said second jumping pulse generating means, and said second signal detecting means to repeatedly operate a predetermined plurality of K times, thereby outputting a plurality of K sets of maximum and minimum levels detected by said first signal detecting means and said minimum and maximum levels detected by said second signal detecting means, and said offset average calculating means calculates an average value of the offset value of said tracking error signal on said adjustment track based on said outputted plurality of K sets of maximum and minimum levels detected by said first signal detecting means and said minimum and maximum levels detected by said second signal detecting means, and for setting said calculated average value as said offset value.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 6a and 6b are flowcharts of a control value detection process of a subroutine shown in FIG. 5;

DETAILED DESCRIPTION OF THE PREFERRED EMBODIMENTS

The preferred embodiments according to the present invention will be described below with reference to the attached drawings.

FIRST PREFERRED EMBODIMENT

Figure 1:
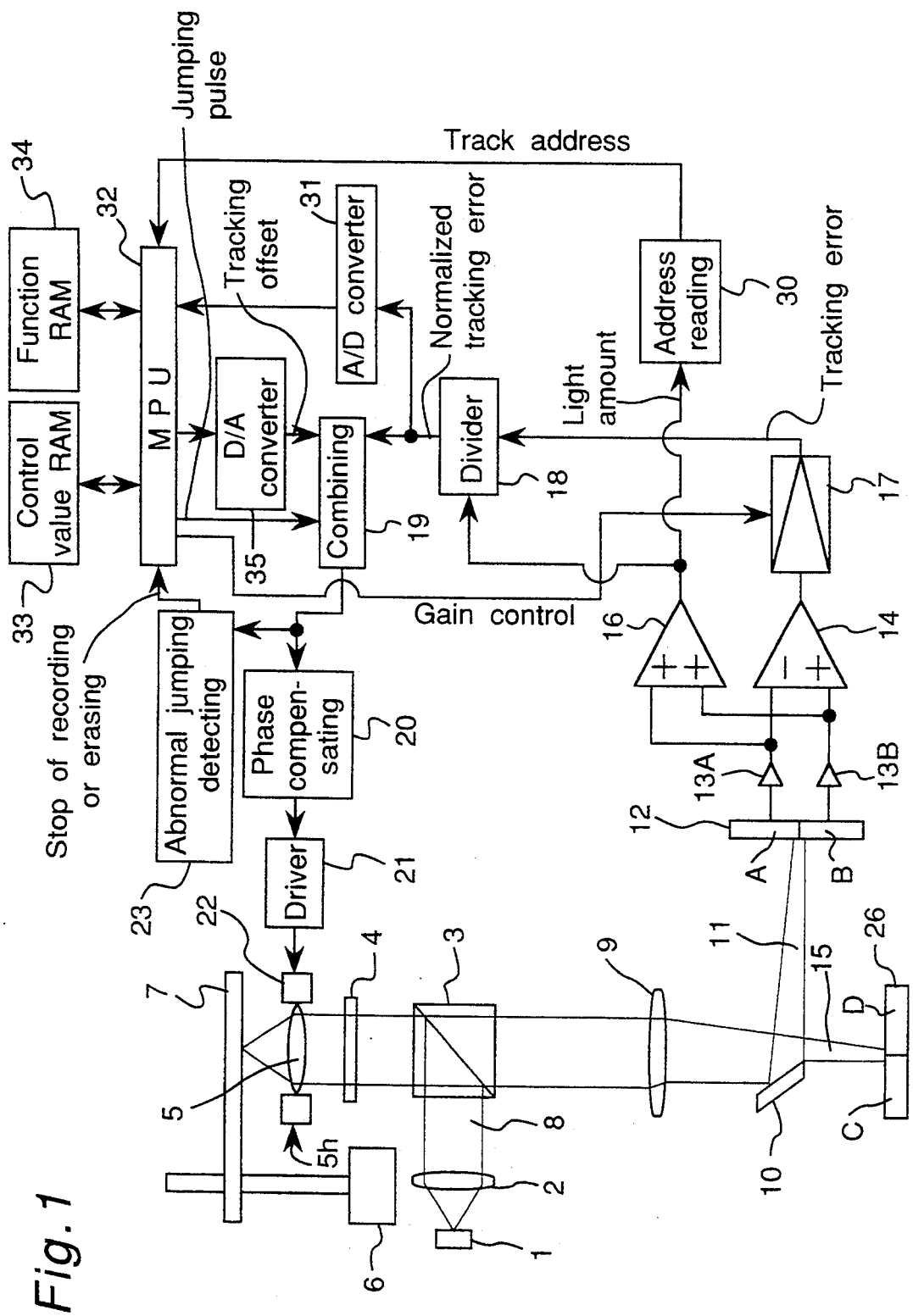
FIG. 1 is a schematic block diagram showing a disk recording and reproducing apparatus comprising a tracking control apparatus for a re-writable magneto-optical disk of a first preferred embodiment according to the present invention.
Figure 21:
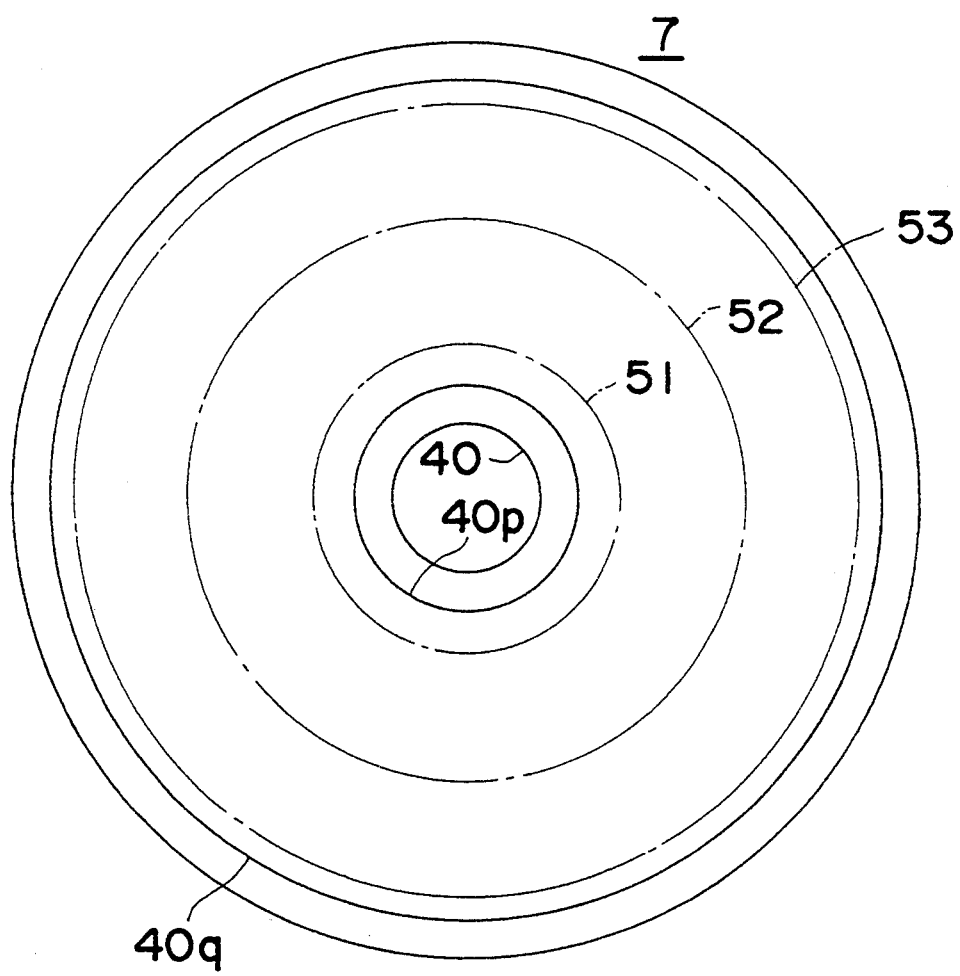
FIG. 21 is a top plan view of a magneto-optical disk of the first preferred embodiment showing three adjustment tracks including a predetermined inner adjustment track located in an inner periphery region of the magneto-optical disk, a predetermined middle adjustment track located in a middle periphery region thereof between the inner and outer periphery region thereof, and a predetermined outer adjustment track located in the outer periphery region thereof.

FIG. 1 shows a disk recording and reproducing apparatus comprising a tracking control apparatus for a re-writable magneto-optical disk of a first preferred embodiment according to the present invention. The tracking control apparatus of the first preferred embodiment is characterized as follows:

(a) a main operation of a tracking control process of the present preferred embodiment is executed by an MPU 32 of a control circuit connected to a control value RAM 33 for storing control values including an offset value Voff of a tracking error signal and a peak-to-peak amplitude value Vpp thereof and a function RAM 34 for storing coefficient data of functions of quadratic non-linear approximate equations of an offset value characteristic on the track address and an amplitude value characteristic on the track address;

(b) in a correction function calculation process (step S6), there are measured offset values of the tracking error signal and peak-to-peak amplitude values thereof on three adjustment tracks including a predetermined inner adjustment track 51 located in an inner periphery region of the magneto-optical disk, a predetermined middle adjustment track 52 located in a middle periphery region thereof between the inner and outer periphery region thereof, and a predetermined outer adjustment track 53 located in the outer periphery region thereof as shown in FIG. 21, and thereafter, there are calculated correction functions including not only a quadratic non-linear approximate equation of an offset value characteristic on the track address but also a quadratic non-linear approximate equation of a peak-to-peak amplitude value characteristic on the track address, based on the measured offset and peak-to-peak amplitude values of the tracking error signal;

(c) in a case of a still process for continuously scanning the same one track to record or reproduce the same information signal, in a correction process (step S8), there are calculated a corrected offset value and a corrected peak-to-peak amplitude value according to the above-calculated correction functions; and (d) in a case of a continuous process for sequentially scanning one track to the next track incrementing the track address by one to continuously record or reproduce information signals, in a continuous process (step S11), there are calculated a corrected offset value and a corrected peak-to-peak amplitude value according to the above-calculated correction functions every track address by reading each track address.

In the present preferred embodiment, the track address of the disk 7 is in a range from 0 to 1000. FIG. 21 shows three adjustment tracks on a recording region located between an inner periphery 40p and an outer periphery 40q of the disk 7 comprising a center chucking hole 40, and the three adjustment tracks include the inner adjustment track 51 located in an inner periphery region of the disk 7, the middle adjustment track 52 located in a middle periphery region thereof between the inner and outer periphery region thereof, and the outer adjustment track 53 located in the outer periphery region thereof. In each of the adjustment tracks 51 to 53, a signal having a predetermined audio frequency is recorded. For example, the track address of the inner adjustment track 51 is preferably set to 100, that of the middle adjusting track 52 is preferably set to 500, and that of the outer adjustment track 53 is preferably set to 900.

Figure 12:
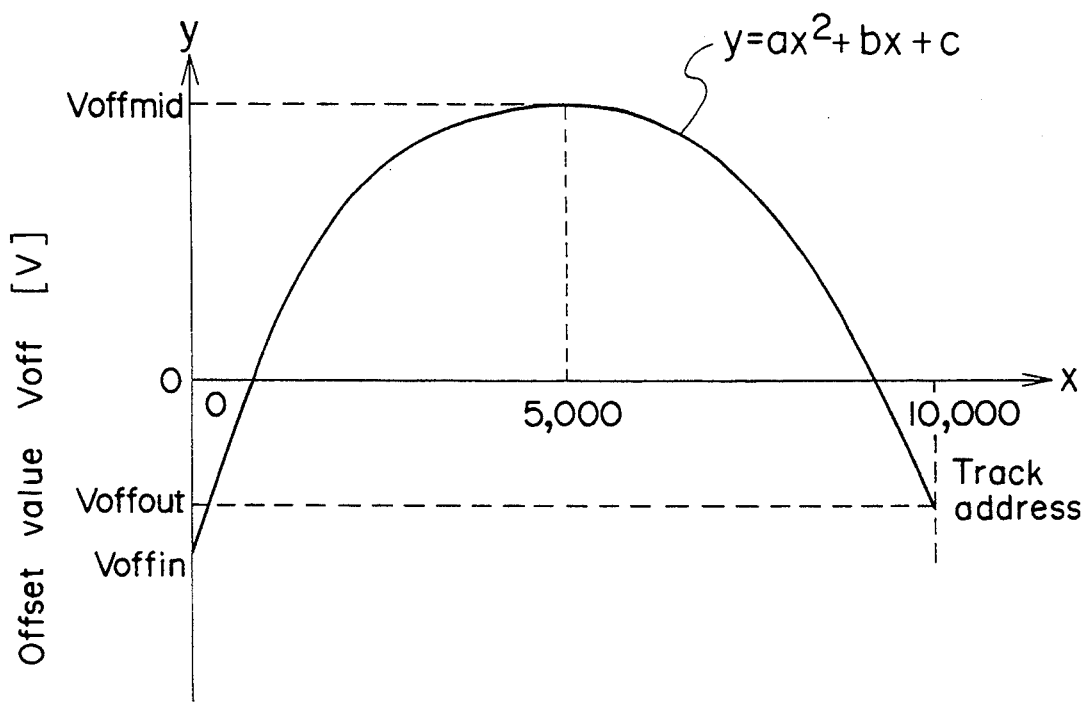
FIG. 12 is a graph of a relationship between an offset value of a tracking error signal and a track address, showing a quadratic non-linear approximate equation of an offset value characteristic on the track address which is used in the first preferred embodiment.
Figure 13:
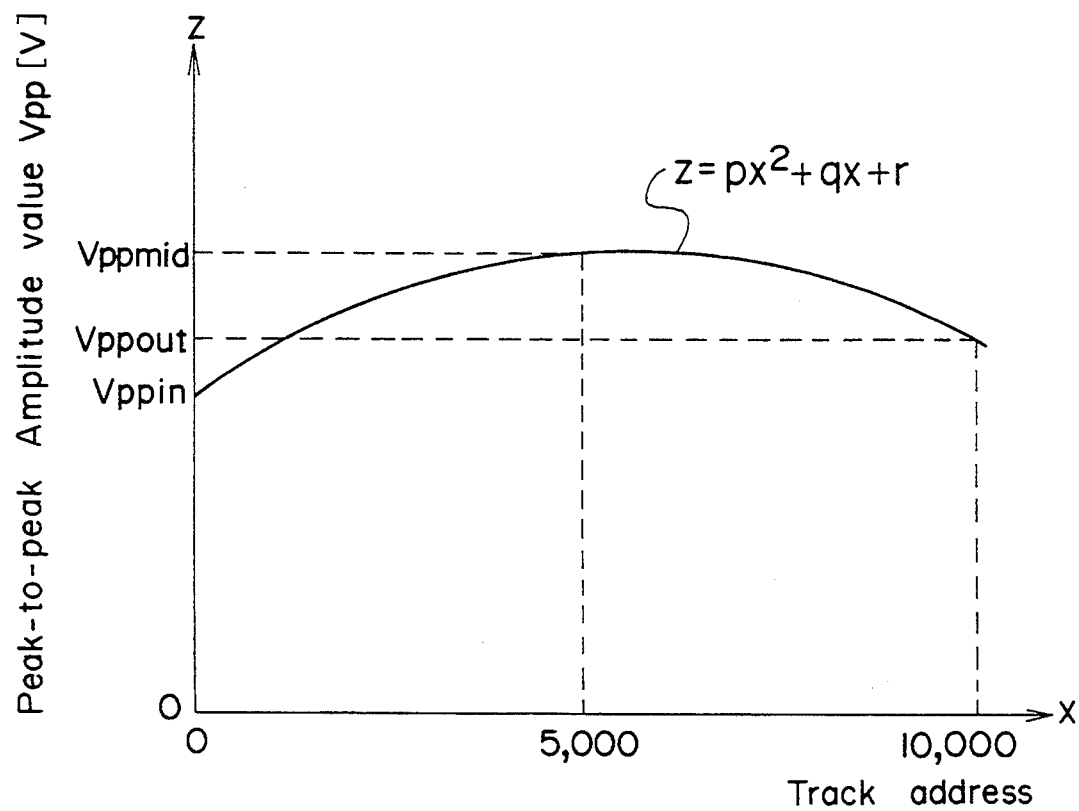
FIG. 13 is a graph of a relationship between a peak-to-peak amplitude value of the tracking error signal and the track address, showing a quadratic non-linear approximate equation of a peak-to-peak amplitude value characteristic on the track address which is used in the first preferred embodiment.

Further, in the present preferred embodiment, an offset value Voff characteristic of the tracking error signal on the track address is approximated by a quadratic approximate equation $y = ax^2 + bx + c$ as shown in FIG. 12, and also a peak-to-peak amplitude value Vpp characteristic of the tracking error signal on the track address is approximated by another quadratic approximate equation $z = px^2 + qx + r$ as shown in FIG. 13.

Referring to FIG. 1, a beam of laser light 8 generated by a light source 1 of a semiconductor laser is converted into parallel rays through a coupling lens 2, and the parallel rays are reflected by a polarizing beam splitter 3. Further, the reflected light is passed through a quarter-wave plate 4, and it is focused by an objective focus lens 5 mounted in an optical head 5h so as to be projected onto a magneto-optical disk 7 which is rotated by a disk motor 6. Then, a beam of light reflected from the disk 7 is passed through the focus lens 5 of the optical head 5h, the quarter-wave plate 4, the polarizing beam splitter 3 and a convergence lens 9, and is incident onto a splitting mirror 10. The splitting mirror 10 splits a beam of incident light into two beams of light, outputs one beam of light 11 onto a photo-detector 12 comprising two photo-detection sections A and B which are continuously mounted in series on a light receiving surface thereof, and outputs another beam of light 15 onto a photo-detector 26 comprising two photo-detection sections C and D which are continuously mounted in series on a light receiving surface thereof. Further, a differential amplifier (not shown) generates a difference signal between the photo-detection signals outputted from the two photo-detection sections C and D of the photo-detector 26, and outputs the generated difference signal as a focus error signal used for controlling a beam of light so that it is in a predetermined focus state on the disk 7 in a manner similar to that known to those skilled in the art.

On the other hand, output signals from the two photo-detection sections A and B of the photo-detector 12 are amplified by amplifiers 13A and 13B, respectively, and then, the amplified output signals from the amplifiers 13A and 13B are inputted to a non-inverted input terminal and an inverted input terminal of an differential amplifier 14, and are also inputted to respective non-inverted input terminals of an adder amplifier 16. The differential amplifier 14 generates a difference signal between the inputted signals, and outputs the generated difference signal as a tracking error signal representing a shift value in the tracking control system, to a divider 18 through a variable gain type amplifier 17 having a gain controlled according to a gain control signal outputted from the MPU 32. On the other hand, the adder amplifier 16 generates an addition signal by adding the inputted signal to each other, and outputs the generated addition signal as a light amount signal representing a reflected light amount of a beam of light from the disk 7, to the divider 18 and an address reading circuit 30.

The divider 18 divides the tracking error signal from the differential amplifier 14 by the light amount signal from the adder amplifier, generates and outputs a normalized tracking error signal having a constant amplitude for change in the light amount, to a combining circuit 19 and an analogue to digital converter 31 (referred to as an A/D converter hereinafter). The A/D converter 31 converts the inputted signal into a digital signal, and then outputs the digital signal as the normalized tracking error signal to the MPU 32. In the tracking control process, the MPU 32 generates and outputs a tracking offset signal having a level of an offset value to be controlled through a digital to analogue converter (referred to as a D/A converter hereinafter) 35 to the combining circuit 19.

Figure 3:
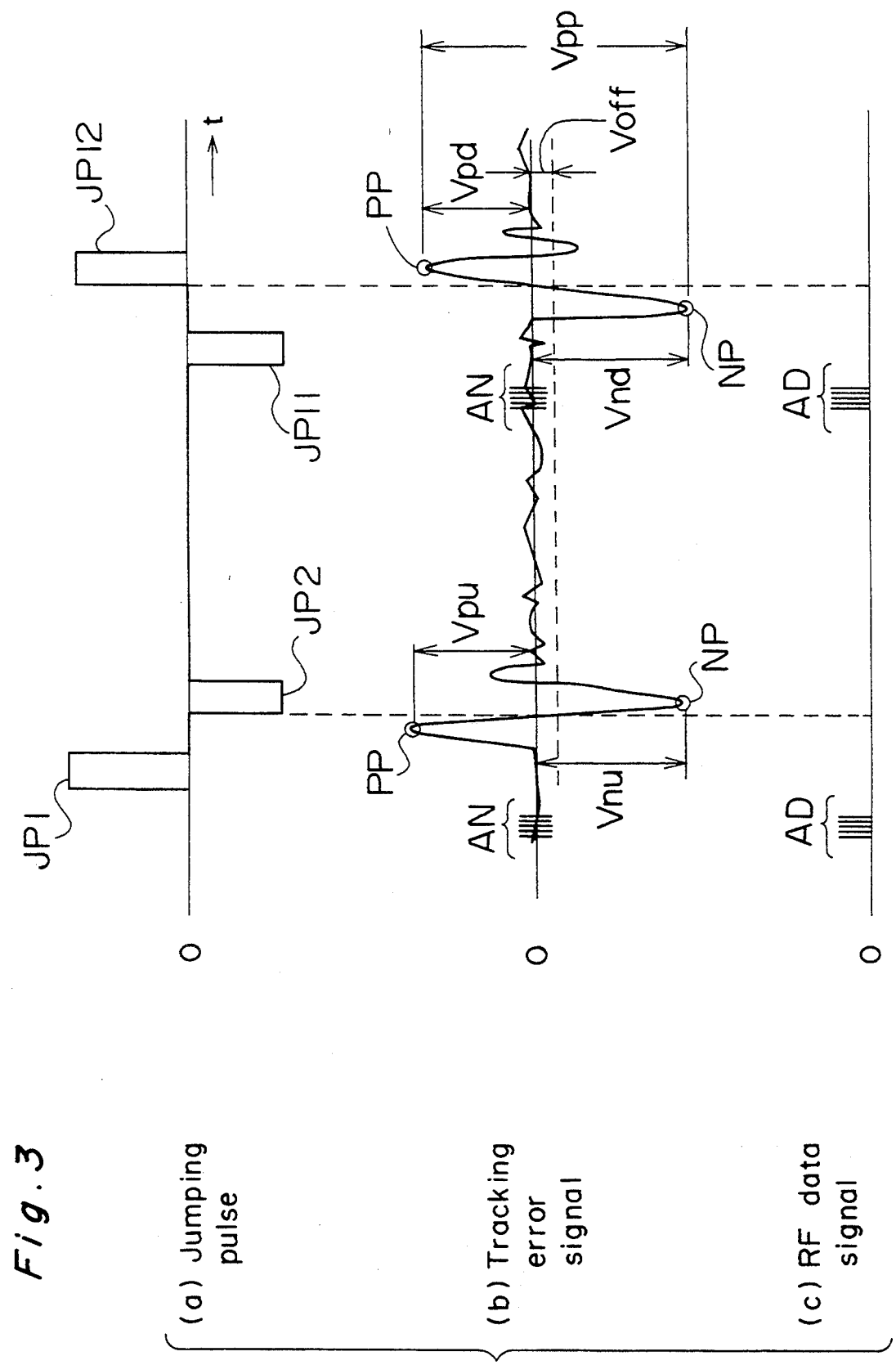
FIG. 3 is a timing chart of jumping pulses, a tracking error signal and an RF data signal in a control value detection process which are used in the tracking control apparatus shown in FIG. 1.

The magneto-optical disk 7 used in the present preferred embodiment is a re-writable RAM disk, and tracks of the disk 7 which information data are to be stored in and read out from are formed corresponding to one circle in a shape of concentric circles on the disk 7 in a predetermined format. In the beginning part of each track of the disk 7, data of a track address are previously stored, and the track addresses are stored in an ascending order in respective tracks located from the inner periphery region to the outer periphery region of the disk 7 wherein one track located on one periphery circle of disk 7 corresponds to one track address. As shown in FIG. 3, the address reading circuit 30 extracts an RF data signal from the light amount signal outputted from the adder amplifier 16, and then detects and outputs a track address AD to the MPU 32.

The tracking control apparatus of disk recording and reproducing apparatus comprises the following two processes: (a) a continuous process (step S11), to be performed in a continuous mode, for recording or storing an information data signal into the disk 7, reproducing or reading out the recorded information signal from the disk 7, or erasing it therefrom, continuously over a plurality of track addresses by the MPU's outputting jumping pulses JP1 and JP2 continuously to sequentially increment the track address by one; and (b) a still process (step S12), to be performed in a still mode, for repeatedly recording an information data signal in a designated track address of the disk 7, repeatedly reproducing the recorded information signal from a designated track address of the disk 7, or erasing it therefrom, continuously. It is to be noted that, in the above-mentioned continuous and still processes, selecting either one of recording, reproducing and erasing is determined in accordance with an instruction command inputted using an operation panel (not shown).

FIG. 3 is a timing chart of jumping pulses, a tracking error signal an RF data signal included in the light amount signal in the control value detection process.

Referring to FIG. 3, when the MPU 32 generates and outputs a pair of positive and negative jumping pulses JP1 and JP2 at a predetermined time interval just after and in synchronous with reading track address data, the tracking error signal steeply increases up to a positive peak PP corresponding to the positive jumping pulse JP1, crosses the zero level, steeply decreases down to a negative peak NP corresponding to the negative jumping pulse JP2 and then goes back to the zero level. In this case, there are measured not only a maximum value Vpu defined as a positive voltage value between the positive peak PP and the zero level but also a minimum value Vnu defined as a negative voltage value between the negative peak NP and the zero level.

Further, when the MPU 32 generates and outputs another pair of negative and positive jumping pulses JP11 and JP12 at the predetermined time interval just after and in synchronous with reading track address data, the tracking error signal steeply decreases down to a negative peak NP corresponding to the negative jumping pulse JP11, crosses the zero level, increases up to a positive peak PP corresponding to the positive jumping pulse JP12 and then goes back to the zero level. In this case, there are measured not only a minimum value Vnd defined as a negative voltage value between the negative peak NP and the zero level but also a maximum value Vpd defined as a positive voltage value between the positive peak PP and the zero level.

In FIG. 3, Voff denotes an offset value of the tracking error signal to be controlled so that it becomes symmetrical with respect to a reference level shifted by the offset value from the zero level, and Vpp denotes a peak-to-peak amplitude of the tracking error signal to be controlled so that it becomes a predetermined constant in the tracking control apparatus. Further, AD denotes track address data, and AN denotes an address noise generated in the tracking error signal due to the track address data.

In the above-mentioned process shown in FIG. 3, since the jumping pulses are generated just after reading track address data, the address noise AN does not influence the tracking error signal when measuring the maximum and minimum values Vpu, Vnu, Vnd and Vpd of the tracking error signal, resulting in improving the preciseness of the measurement of the tracking error signal.

As described in detail later, the MPU 32 generates and outputs a pair of jumping pulses JP1 and JP2 or another pair of jumping pulses JP11 and JP12 as shown in FIG. 3 to the combining circuit 19 in not only the above-mentioned continuous process (step S11) but also in a control value detection process (steps S22, S24 and S26) shown in FIGS. 6a and 6b, and also generates and outputs a tracking offset signal having a level of an offset value Voff for the tracking control of the present preferred embodiment to the combining circuit 19 in the correction process (step S8) and the continuous process (step S11).

Further, the combining circuit 19 of an adder amplifier combines the normalized tracking error signal from the divider 18 with either a jumping pulse from the MPU 32 or the tracking offset signal from the MPU 32 through the D/A converter 35 by adding the normalized tracking error signal to either the jumping pulse or the tracking offset signal. Then, the combining circuit 19 outputs the combined or added signal through a phase compensating circuit 20 for compensating the phase of the tracking control system to an optical head driver 21, and also outputs it to an abnormal jumping detecting circuit 23. When the combined signal inputted to the abnormal jumping detecting circuit 23 is larger than a predetermined level upon recording or erasing an information data signal, the abnormal jumping detecting circuit 23 generates and outputs a stop signal instructing to stop the recording or erasing process, through the MPU 32 to a laser control circuit (not shown) for controlling the light source 1, thereby stopping the recording or erasing process just before the optical head 5h jumps from the current track to the adjacent track. Therefore, any track jumping upon recording or erasing an information data signal caused due to oscillation, shock or the like can be prevented, and then information data which have been already recorded in the adjacent track can be prevented from being damaged or broken.

Further, the optical head driver 21 amplifies the inputted signal and drives a servo coil 22 of the optical head 5h so that the focus lens 5 is moved in a direction perpendicular to an optical axis of the focus lens 5 or perpendicular to a tangent line of each track which is parallel to the radial direction of the disk 7. In the tracking control apparatus, the focus lens 5 is controlled to be moved so that the normalized tracking error signal becomes zero.

Figure 6B:
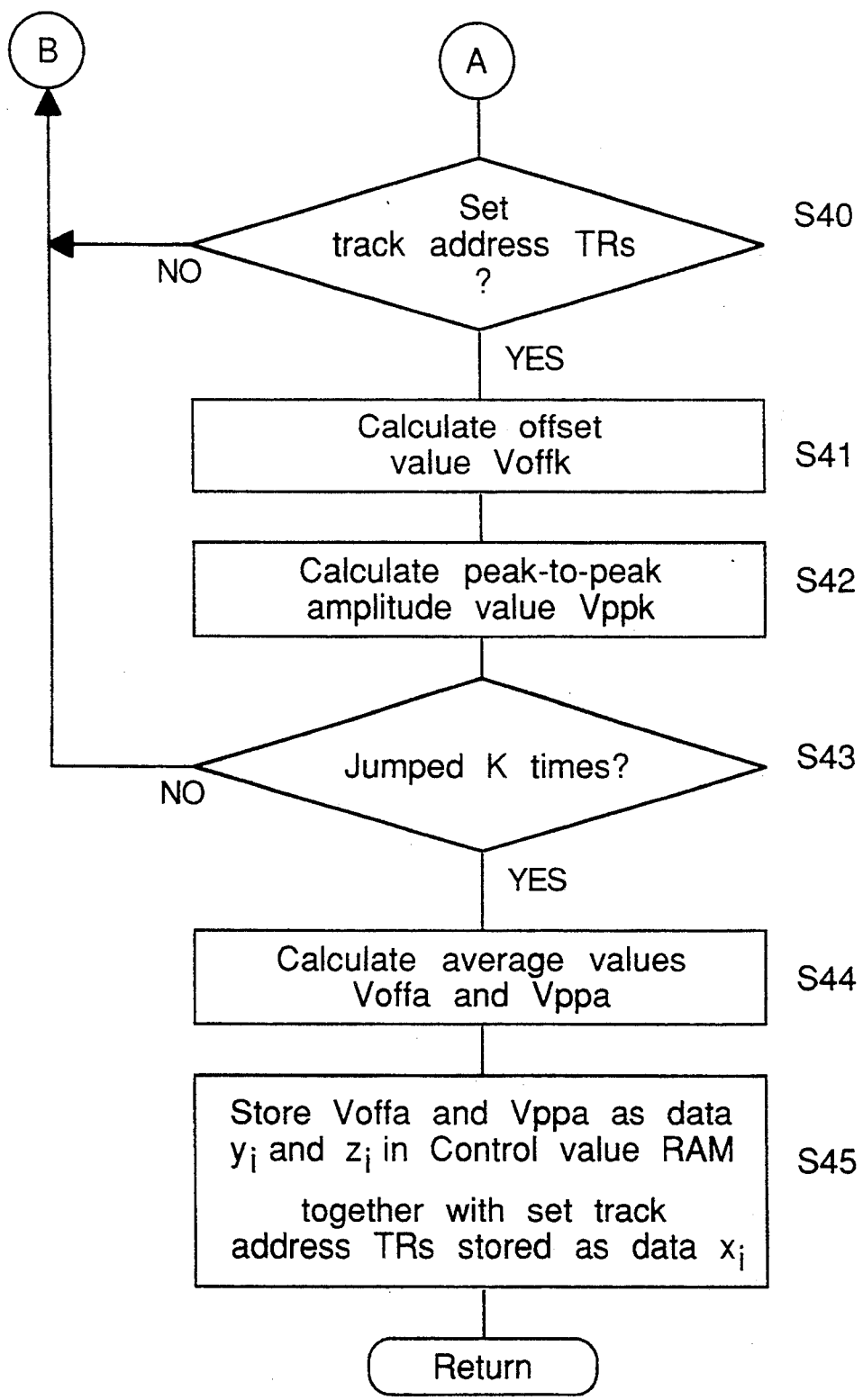

The tracking control apparatus comprises the control value detection process (steps S22, S24 and S26) shown in FIGS. 6a and 6b including the following steps of:

(a) sequentially detecting maximum and minimum voltages Vpu and Vnu of the normalized tracking error signal outputted from the divider 18 through the A/D converter 31 after the MPU 32 sequentially outputs the jumping pulses JP1 and JP2 to the combining circuit 19 as shown in FIG. 3, so as to jump a track address TRs to the next track address (TRs+1) (this track jumping is referred to as a first pair of track jumps hereinafter);

(b) sequentially detecting minimum and maximum voltages Vnd and Vpd of the normalized tracking error signal after the MPU 32 sequentially outputs the jumping pulses JP11 and JP12 to the combining circuit 19 as shown in FIG. 3, so as to jump the track address (TRs+1) to the previous track address TRs (this track jumping is referred to as a second pair of track jumps hereinafter);

(c) calculating an average offset value Voffk of the tracking error signal according to the following equation:

$$Voffk = \{(Vpu + Vpd)/2 + (Vnu + Vnd)/2\}/2 \quad (1);$$

(d) calculating an average peak-to-peak amplitude value Vppk of the tracking error signal according to the following equation:

$$Vppk = (Vpu + Vpd)/2 - (Vnu + Vnd)/2 \quad (2);$$

(e) repeating the above-mentioned processes (a) through (d) a predetermined plurality of K times, namely, performing a set of track jumps including the first and second pairs of track jumps K times, wherein the integer K is preferably set to an integer ranging from three to nine; and (f) after the above-mentioned process (e), calculating an average value Voffa of the K offset values Voffk (k=1, 2, ..., K) and an average value Vppa of the K peak-to-peak amplitude values Vppk (k=1, 2, ..., K), and then storing the calculated average values Voffa and Vppa as control values into the control RAM 33. In the present preferred embodiment, there are obtained the above-mentioned control values Voffa and Vppa with respect to the inner, middle and outer adjustment tracks 51 to 53 at steps S22, S24 and S26 as described in detail later.

Thereafter, in the correction function calculation process (step S6), the MPU 32 calculates respective coefficients of correction functions including a quadratic non-linear approximate equation $y = ax^2 + bx + c$ of an offset value y characteristic on a track address x and a quadratic non-linear approximate equation $z = px^2 + qx + r$ of a peak-to-peak amplitude value z characteristic on the track address x, based on the above-obtained control values Voffa and Vppa with respect to the inner, middle and outer adjustment tracks 51 to 53. Further, in the correction process (step S8) and the continuous process (step S11), the MPU 32 calculates an offset value Voff of the tracking error signal corresponding to a track address to be controlled according to the quadratic non-linear approximate equation $y = ax^2 + bx + c$, and generates and outputs the tracking offset signal having a level of the calculated offset value Voff to the combining circuit 19 through the D/A converter 35, and then the offset value or the DC level of the normalized tracking error signal inputted to the MPU 32 is controlled so that it becomes symmetrical with respect to a reference level offset by the offset value Voff from the DC level even though the tracking error signal becomes asymmetrical with respect to the DC level.

Figure 2:
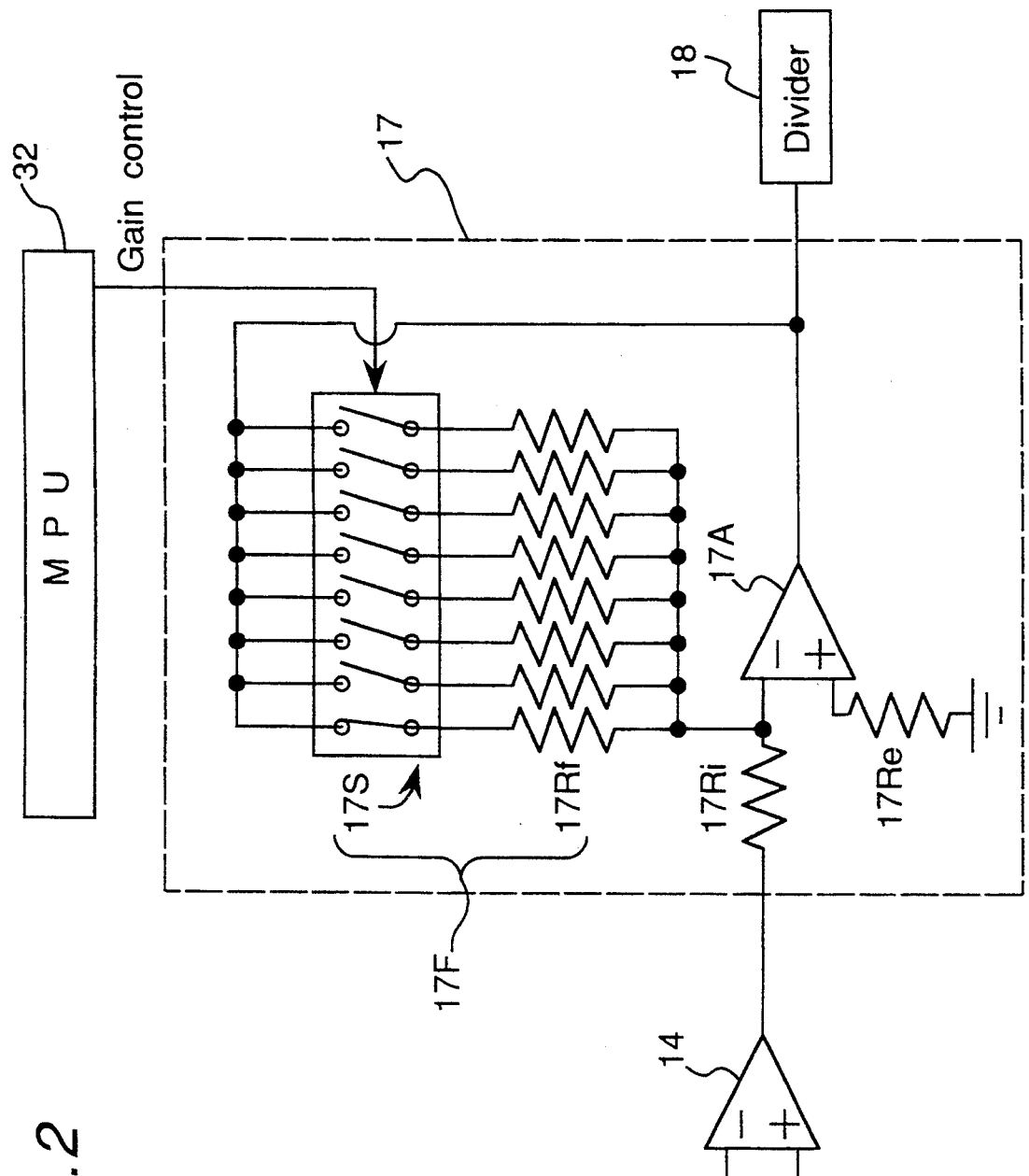
FIG. 2 is a circuit diagram of a variable gain type amplifier shown in FIG. 1.

FIG. 2 shows a composition of the variable gain type amplifier 17 shown in FIG. 1.

Referring to FIG. 2, the variable gain type amplifier 17 comprises a differential amplifier 17A, a reference voltage resister 17Re connected between a non-inverted input terminal thereof and the ground, an input resister 17Ri between the output terminal of the differential amplifier 14 and an inverted input terminal of the differential amplifier 17A, and a feedback circuit connected between the inverted input terminal of the differential amplifier 17A and the output terminal thereof. The feedback circuit comprises a plurality of feedback resisters 17Rf having resister values different from each other and a plurality of switches 17S which are respectively connected in series to each other. The switches 17S are controlled according to the gain control signal from the MPU 32 so that any one of the switches 17S is turn on and others are turned off. Since the resister value of the feedback circuit 17F is changed according to the gain control signal, the amplification factor of the variable gain type amplifier 17 is changed.

Furthermore, in the correction process (step S8) and the continuous process (step S11), the MPU 32 calculates a peak-to-peak amplitude value Vpp of the tracking error signal corresponding to the track address to be controlled according to the quadratic non-linear approximate equation $z = px^2 + qx + r$, and generates and outputs the gain control signal corresponding to the calculated peak-to-peak amplitude value Vpp to the variable gain type amplifier 17, and then the amplitude of the normalized tracking error signal inputted to the MPU 32 is controlled so that it becomes constant even though the amplitude of the normalized error signal changes from an initial value, for example, when the present disk recording and reproducing apparatus was shipped, due to a positioning error in positioning the optical head 5h, a dispersion of disks, a secular change, a difference between circumferences of inner and outer regions of the recording medium, a difference between ROM and RAM areas of the disk 7 or the like.

By the above-mentioned tracking control using the offset value Voff and the amplitude value Vpp, the optical head driver 22 is controlled so that the optical head 5h is scanned on the center of the designated track.

Figure 4:
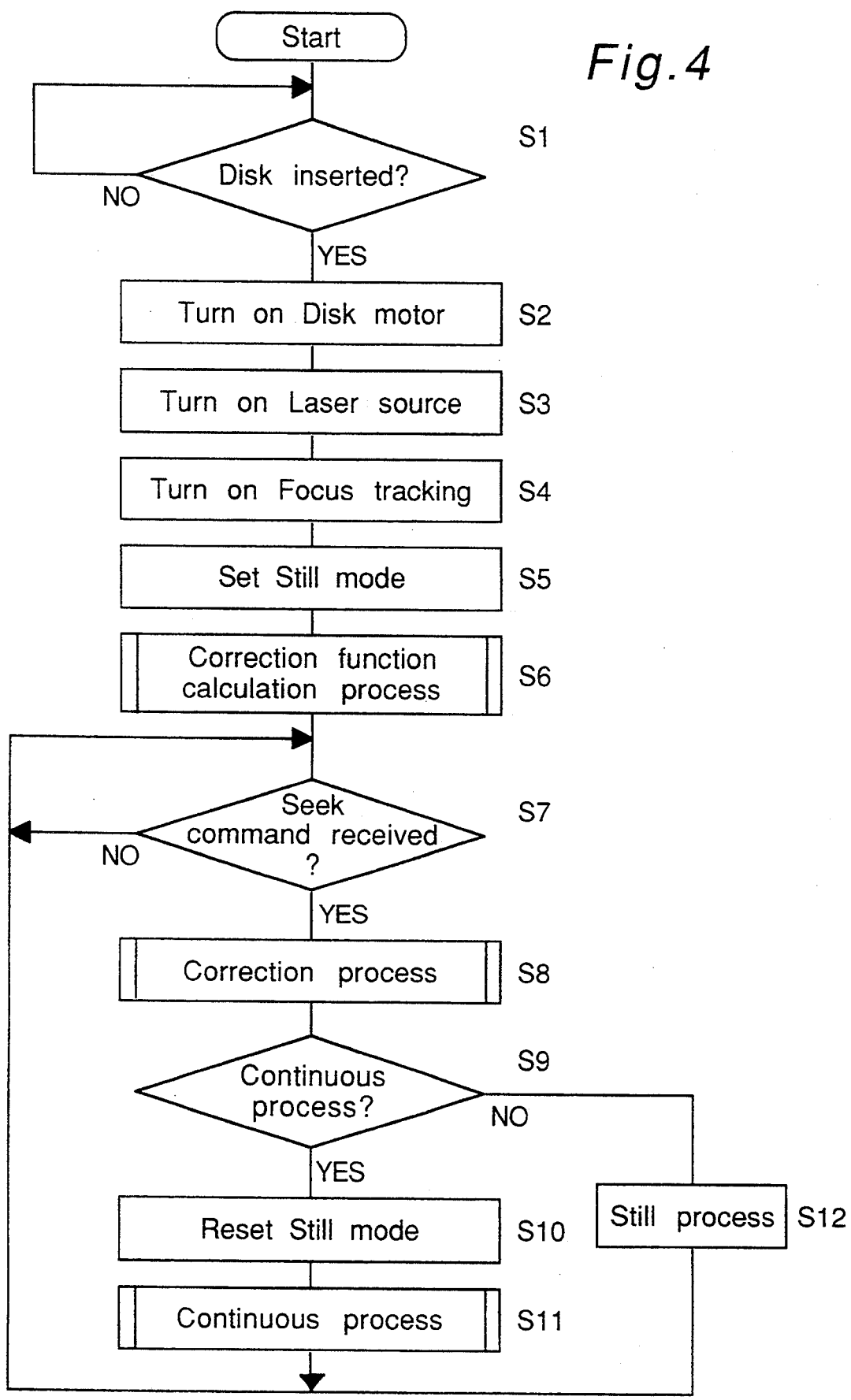
FIG. 4 is a flowchart of a main operation of a tracking control process which is executed by an micro processing unit (referred to as an MPU hereinafter) shown in FIG. 1.

FIG. 4 is a flowchart of a main flow of the tracking control process which is executed by the MPU 32.

Figure 5:
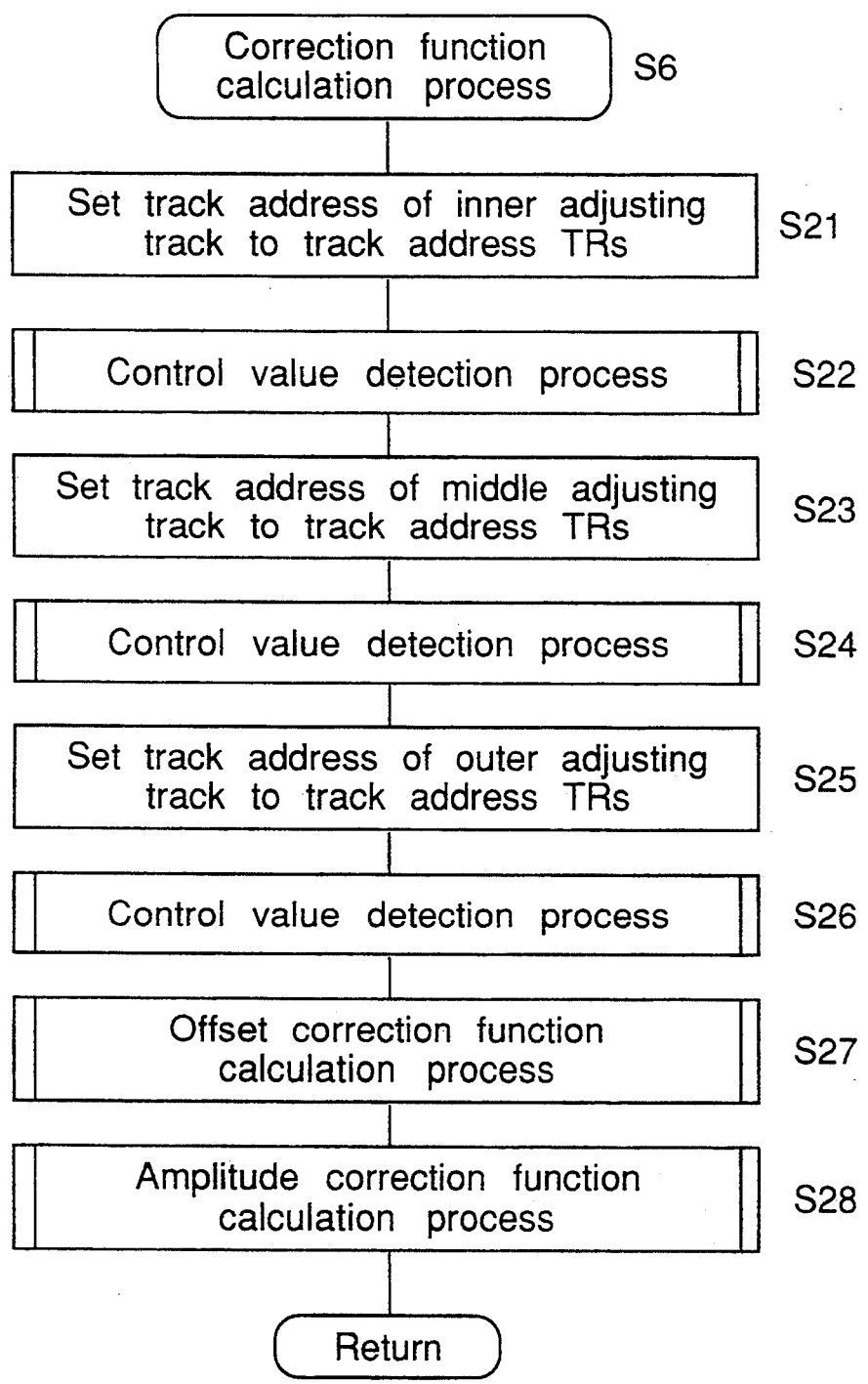
FIG. 5 is a flowchart of a correction function calculation process of a subroutine shown in FIG. 4.

The tracking control process is started when a power switch (not shown) is turned on. Referring to FIG. 4, first of all, it is judged at step S1 whether or not the disk 7 has been inserted into the disk recording and reproducing apparatus. If the disk 7 has been inserted, the disk motor 6 is turned on at step S2 so that the disk 7 is rotated in a predetermined rotation speed, and the light source 1 is turned on at step S3 so that a beam of laser light is emitted therefrom. Further, the focus tracking is turned on at step S4, and the still mode is set at step S5 then the optical head 5h is repeatedly scanned on the same one track of the disk 7. Thereafter, the correction function calculation process S6 is executed as shown in FIG. 5.

Figure 9:
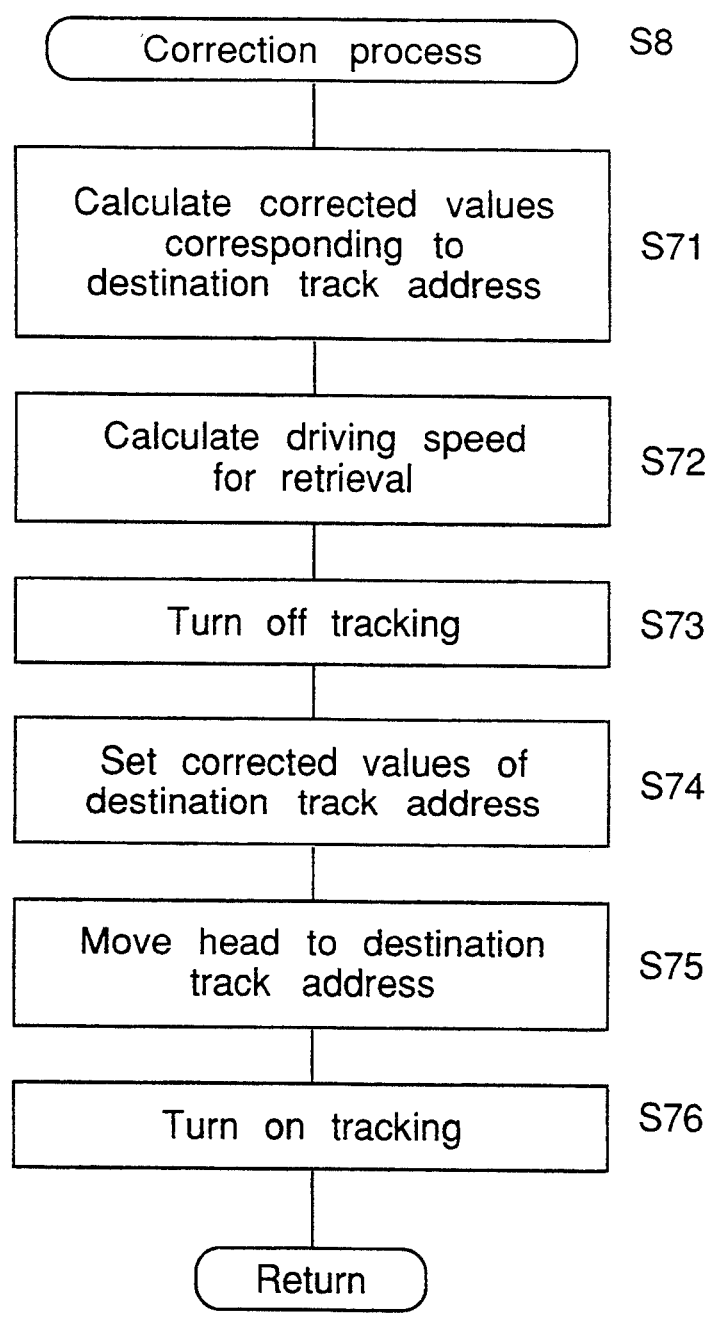
FIG. 9 is a flowchart of a correction process of a subroutine shown in FIG. 5.

Then, it is judged at step S7 whether or not a seek command for retrieving a designated or destination track address has been received together with data of the track address to be retrieved. If the seek command has not been received (NO at step S7), the judgment process of step S7 is performed again. On the other hand, if the seek command has been received (YES at step S7), the correction process is executed at step S8 as shown in FIG. 9, and then the program flow proceeds to step S9.

Figure 10:
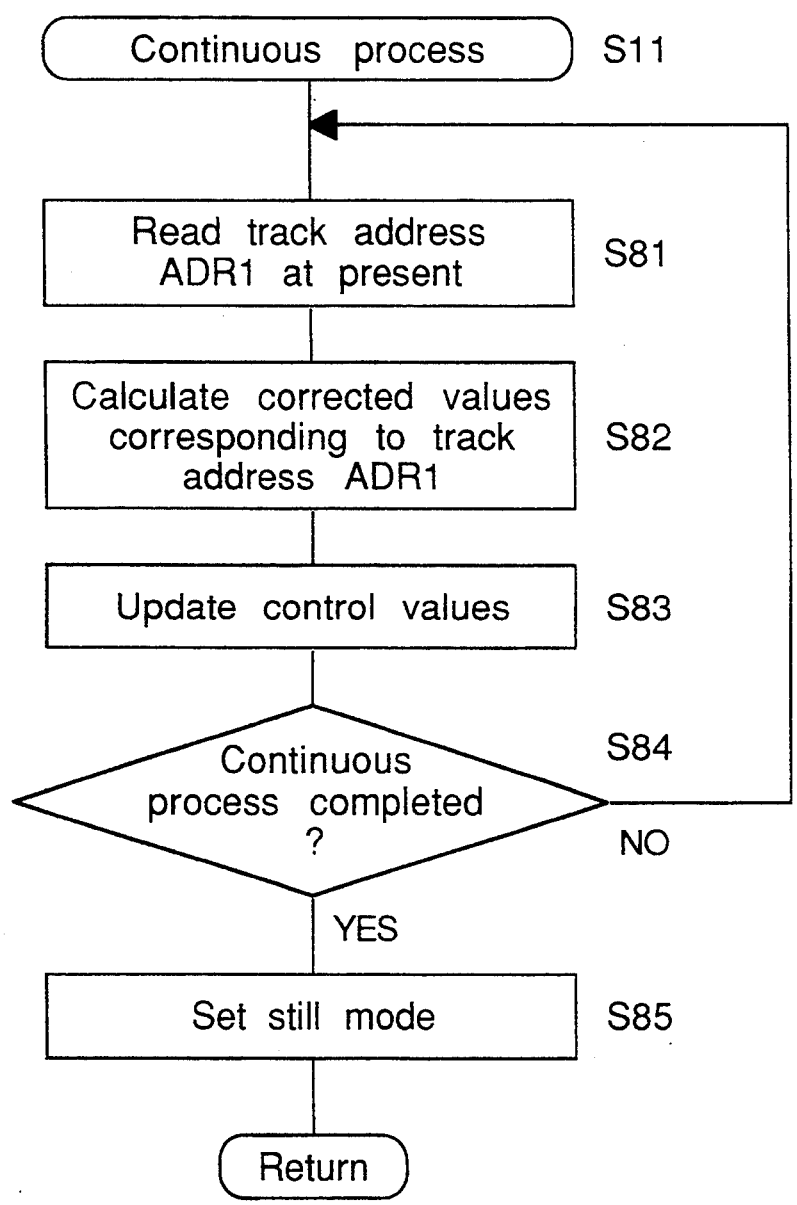
FIG. 10 is a flowchart of a continuous process of a subroutine shown in FIG. 5.

Thereafter, it is judged at step S9 whether or not an instruction command of the continuous process has been received. If the instruction command of the continuous process has been received (YES at step S9), the still mode is reset and the continuous mode is set at step S10, and then the optical head 5h is scanned sequentially in an ascending order of the track address of the disk 7. Thereafter, the continuous process is executed at step S11 as shown in FIG. 10, and then the program flow goes back to step S7.

On the other hand, if the instruction command of the continuous process has not been received (NO at step S9), the still process for continuously scanning the same one track to record or reproduce the same information signal is executed at step S12, performing the tracking control using the offset value Voff and the peak-to-peak amplitude value Vpp which have been calculated and set in the correction process S8, and then the program flow proceeds to step S7.

FIG. 5 is a flowchart of the correction function calculation process (step S6) of a subroutine shown in FIG. 4.

Referring to FIG. 5, the track address of the predetermined inner adjustment track is set to the track address TRs at step S21 in order to retrieve the inner adjustment track on the disk 7, and the control value detection process with respect to the inner adjustment track is executed at step S22 as shown in FIGS. 6a and 6b. Thereafter, the track address of the predetermined middle adjustment track is set to the track address TRs at step S23 in order to retrieve the middle adjustment track on the disk 7, and the control value detection process with respect to the middle adjustment track is executed at step S24 as shown in FIGS. 6a and 6b. Further, the track address of the predetermined outer adjustment track is set to the track address TRs at step S25 in order to retrieve the outer adjustment track on the disk 7, and the control value detection process with respect to the middle adjustment track is executed at step S26 as shown in FIGS. 6a and 6b.

Figure 7:
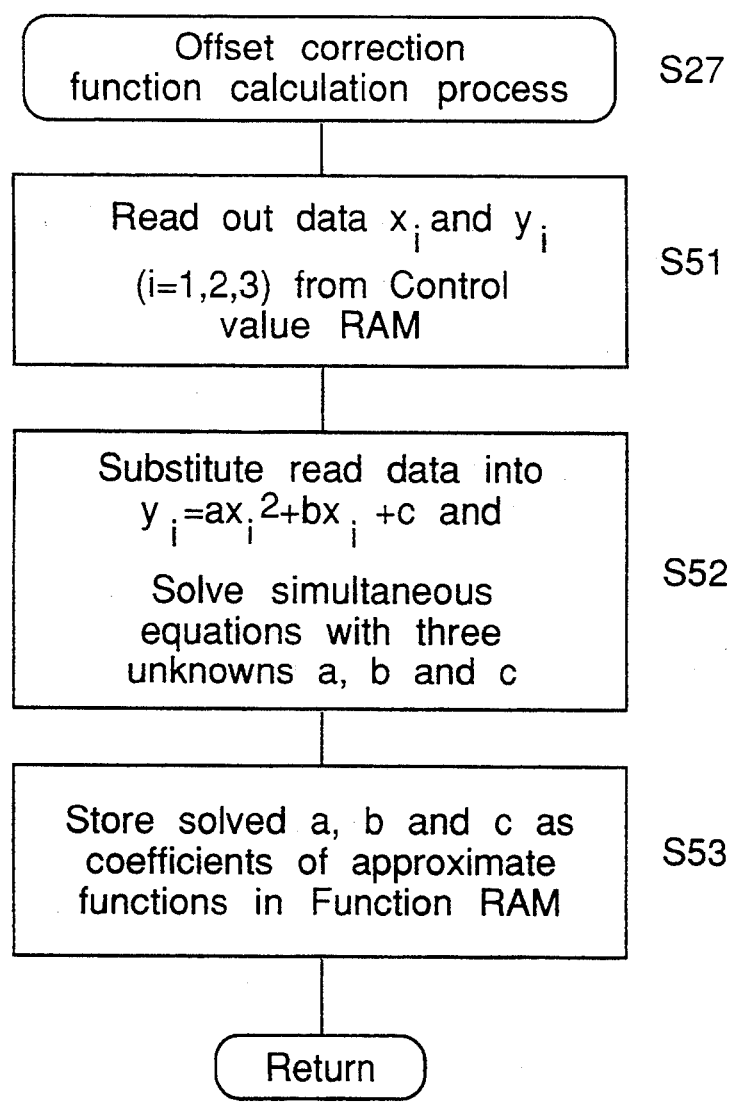
FIG. 7 is a flowchart of an offset correction function calculation process of a subroutine shown in FIG. 5.
Figure 8:
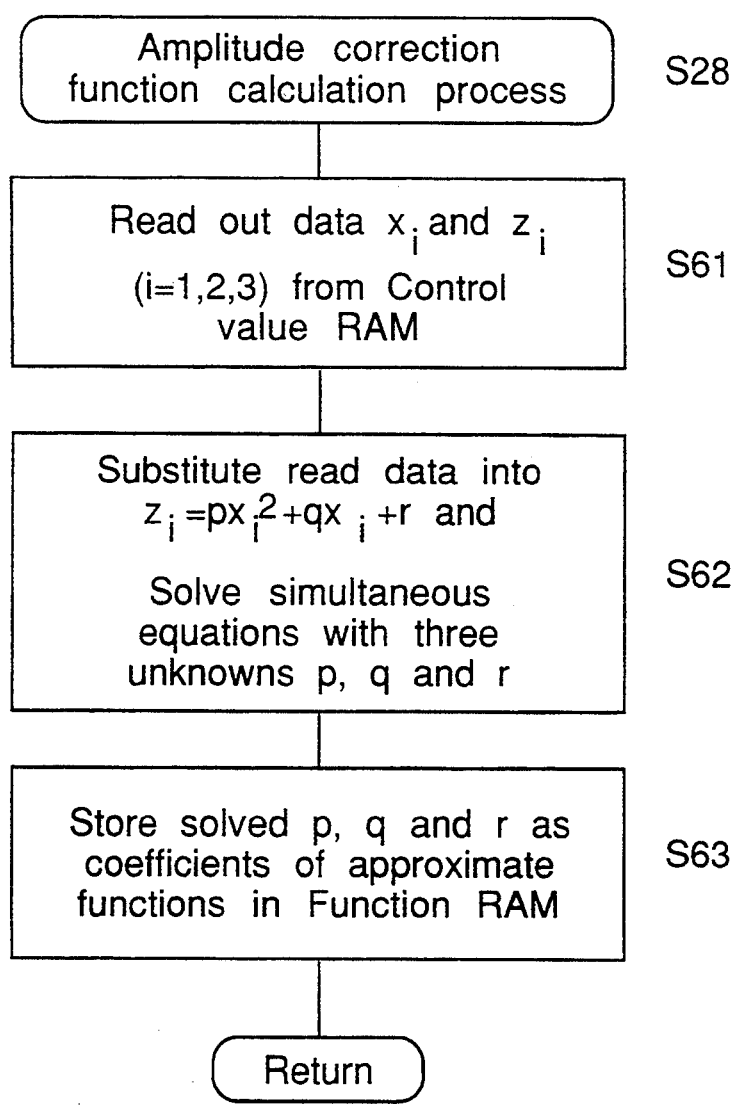
FIG. 8 is a flowchart of an amplitude correction function calculation process of a subroutine shown in FIG. 5.

Further, an offset correction function calculation process for calculating coefficients of a correction function of the quadratic non-linear approximate equation of an offset value characteristic on a track address is executed at step S27 as shown in FIG. 7, and then an amplitude correction function calculation process for calculating coefficients of a correction function of the quadratic non-linear approximate equation of a peak-to-peak amplitude value characteristic on the track address is executed at step S28 as shown in FIG. 8. Thereafter, the program flow returns to the main routine.

FIGS. 6a and 6b are flowcharts of the control value detection process (steps S22, S24 and S26) of a subroutine shown in FIG. 5.

Referring to FIG. 6a, first of all, the optical head 5h is moved at step S31 to the track address TRs which has been set in the correction function calculation process (step S6), and it is judged at step S32 whether or not the optical head 5h is scanned on the track of the track address TRs by reading the track address signal from address reading circuit 30. If the optical head 5h is not scanned on the set track address TRs (NO at step S32), the program flow goes back to step S31. On the other hand, if the optical head 5h is scanned on the set track address TRs (YES at step S32), the program flow proceeds to step S33.

Thereafter, there are sequentially detected at steps 34 and 35 the maximum and minimum voltages Vpu and Vnu of the normalized tracking error signal inputted from the divider 18 through the A/D converter 31 respectively when the MPU 32 sequentially outputs the positive and negative jumping pulses JP1 and JP2 to the combining circuit 19 as shown in FIG. 3 so as to jump a track address TRs to the next track address (TRs+1) at step S33. Then, it is judged at step S36 whether or not the optical head 5h is scanned on the track of the next track address (TRs+1) by reading the track address signal from address reading circuit 30. If the optical head 5h is not scanned on the next track address (TRs+1) (NO at step S36), the program flow goes back to step S31. On the other hand, if the optical head 5h is scanned on the next track address (TRs+1) (YES at step S36), the program flow proceeds to step S37.

Thereafter, there are sequentially detected at steps S38 and S39 the minimum and maximum voltages Vnd and Vpd of the normalized tracking error signal when the MPU 32 sequentially outputs the negative and positive jumping pulses JP11 and JP12 to the combining circuit 19 as shown in FIG. 3 so as to jump the track address (TRs+1) to the previous track address TRs at step S37. Then, it is judged at step S40 whether or not the optical head 5h is scanned on the track of the previous track address TRs by reading the track address signal from address reading circuit 30. If the optical head 5h is not scanned on the previous track address TRs (NO at step S40), the program flow goes back to step S31. On the other hand, if the optical head 5h is scanned on the previous track address (TRs+1) (YES at step S40), the program flow proceeds to step S41.

Thereafter, there is calculated an average offset value Voffk of the tracking error signal upon the first and second pairs of track jumps according to the above-mentioned equation (1) at step S41, and then the calculated average offset value Voffk is temporarily stored in a working RAM (not shown) provided in the MPU 32. Then, there is calculated an average peak-to-peak amplitude value Vppk of the tracking error signal according to the above-mentioned equation (2), and then the calculated average amplitude value Vppk is temporarily stored in the working RAM of the MPU 32.

Further, it is judged whether or not a set of processes of steps S31 through S42 is repeatedly performed a plurality of K times. If a set of processes of steps S31 through S42 has not been repeatedly performed a plurality of K times (NO at step S43), the program flow goes back to step S31. On the other hand, if a set of processes of steps S31 through S42 has been repeatedly performed a plurality of K times (YES at step S43), the program flow proceeds to step S44.

Thereafter, there are calculated at steps S44 and S45 an average value Voffa of the K offset values Voffk and an average value Vppa of the K peak-to-peak amplitude values Vppk, and then there are stored at step S45 the calculated average values Voffa and Vppa as control value data $Y_i$ and $z_i$ into the control value RAM 33 together with the set track address TRs stored as track address data $x_i$, wherein a natural number i=1 when the set track address TRs is of the inner adjustment track 51, i=2 when the set track address TRs is of the middle adjustment track 52, and i=3 when the set track address TRs is of the outer adjustment track 53. In the present preferred embodiment, there are obtained the above-mentioned control values Voffa and Vppa with respect to the inner, middle and outer adjustment tracks 51 to 53, as described above.

FIG. 7 is a flowchart of the offset correction function calculation process (step S27) of a subroutine shown in FIG. 5.

Referring to FIG. 7, first of all, the control value data $x_i$ and $Y_i$ ($i=1$, 2 and 3) stored at step 45 are read out from the control value RAM 33 at step S51. Thereafter, the read control value data $x_i$ and $Y_i$ ($i=1$, 2 and 3) are substituted into respective $x_i$ and $y_i$ of quadratic approximate equations $y_i=ax_i^2+bx_i+c$ ($i=1$, 2 and 3) at step S52, thereby making simultaneous quadratic equations $y_i=ax_i^2+bx_i+c$ ($i=1$, 2 and 3) with three unknown coefficients a, b and c, and then the made simultaneous quadratic equations are solved, thereby obtaining the coefficients a, b and c and determining the quadratic approximate equation or function $y=ax^2+bx+c$ representing an offset value characteristic on the track address as shown in FIG. 12. In FIG. 12, an offset value Voffin is of the track address 0, an offset value Voffmid is of the track address 5,000, and an offset value Voffout is of the track address 10,000. Thereafter, the solved coefficients a, b and c of the quadratic approximate equation are stored into the function RAM 34 at step S53, and then the program flow returns to the original routine.

FIG. 8 is a flowchart of the amplitude correction function calculation process (step S28) of a subroutine shown in FIG. 5.

Referring to FIG. 8, first of all, the control value data $x_i$ and $z_i$ ($i=1$, 2 and 3) stored at step 45 are read out from the control value RAM 33 at step S61. Thereafter, the read control value data $x_i$ and $z_i$ ($i=1$, 2 and 3) are substituted into respective $x_i$ and $z_i$ of a quadratic approximate equation $z_i=px_i^2+qx_i+r$ ($i=1$, 2 and 3) at step S62, thereby making simultaneous quadratic equations $z_i=px_i^2+qx_i+r$ ($i=1$, 2 and 3) with three unknown coefficients p, q and r, and then the made simultaneous quadratic equations are solved, thereby obtaining the coefficients p, q and r and determining the quadratic approximate equation or function $z=px^2+qx+r$ representing an offset value characteristic on the track address as shown in FIG. 13. In FIG. 13, a peak-to-peak amplitude value Vppin is of the track address 0, a peak-to-peak amplitude value Vppmid is of the track address 5,000, and a peak-to-peak amplitude value Vppout is of the track address 10,000. Thereafter, the solved coefficients p, q and r of the quadratic approximate equation are stored into the function RAM 34 at step S63, and then the program flow returns to the original routine.

FIG. 9 is a flowchart of the correction process (step S8) of a subroutine shown in FIG. 5. As described above, the correction process is executed when a seek command has been received together with the data of the track address to be retrieved (referred to a destination track address hereinafter).

Referring to FIG. 9, there are calculated corrected values including an offset value Voff and a peak-to-peak amplitude value Vpp of the tracking error signal, corresponding to the destination track address at step S71 according to the approximate equations $y=ax^2+bx+c$ and $z=px^2+qx+r$ wherein the coefficients a, b, c, p, q and r are stored in the function RAM 34, namely, there are calculated the above corrected values $y=Voff$ and $z=Vpp$ by substituting the destination track address data x into the approximate equations $y=ax^2+bx+c$ and $z=px^2+qx+r$ and calculating the values y and z of the approximate equations. Thereafter, a driving speed for driving the optical head $5h$ when retrieving the destination track address is calculated at step S72, and then the tracking control is turned off at step S73. Then, the corrected values Voff and Vpp calculated at step S71 are set to correct the tracking error signal at step S74, namely, the MPU 32 generates and outputs the tracking offset signal having a level of the corrected offset value Voff through the D/A converter 35 to the combining circuit 19 so as to correct the offset value or the DC level of the normalized tracking error signal, and also generates and outputs to the variable gain type amplifier 17 the gain control signal representing the gain of the variable gain type amplifier 17 which corresponds to the corrected peak-to-peak amplitude value Vpp so as to correct the amplitude of the normalized tracking error signal. Thereafter, the optical head $5h$ is moved to the destination track address of the disk 7 at step S75, and then the tracking control is turned on at step S76. Then, the program flow returns to the main routine.

FIG. 10 is a flowchart of the continuous process (step S11) of a subroutine shown in FIG. 5.

Referring to FIG. 10, the current track address ADR1 is read out from the prerecorded track address of the disk 7 by receiving the track address data from the address reading circuit 30 at step S81, and then there are calculated at step S82 the corrected offset and amplitude values $y=Voff$ and $z=Vpp$ by substituting the current track address $x=ADR1$ into the determined approximate equations $y=ax^2+bx+c$ and $z=px^2+qx+r$ and calculating the values y and z of the approximate equations. Thereafter, the control values Voff and Vpp are updated at step S83, namely, the corrected values Voff and Vpp of the current address ADR1 calculated at step S82 are set to correct the tracking error signal at step S83, namely, the MPU 32 generates and outputs the tracking offset signal having a level of the corrected offset value Voff through the D/A converter 35 to the combining circuit 19 so as to correct the offset value or the DC level of the normalized tracking error signal, and also generates and outputs to the variable gain type amplifier 17 the gain control signal representing the gain of the variable gain type amplifier 17 which corresponds to the corrected peak-to-peak amplitude value Vpp so as to correct the amplitude of the normalized tracking error signal.

Further, it is judged at step S84 whether or not the continuous process which has been instructed by the seek command has been completed. If the continuous process has not been completed (NO at step S84), the program flow goes back to step S81, and then the processes from step S81 to step S83 are repeatedly executed every track address until the continuous process has been completed. That is, the continuous process of recording, reproducing or erasing process is executed with updating the control values Voff and Vpp by one track address. On the other hand, if the continuous process has been completed (YES at step S84), the still mode is set at step S85, and then the program flow returns to the main routine.

In such a case of using the quadratic approximate equations, there may be measured the offset values Voff and the peak-to-peak amplitude values Vpp at at least three different points on the track address for each of the approximate equations of the offset value Voff and the amplitude value Vpp.

Figure 14:
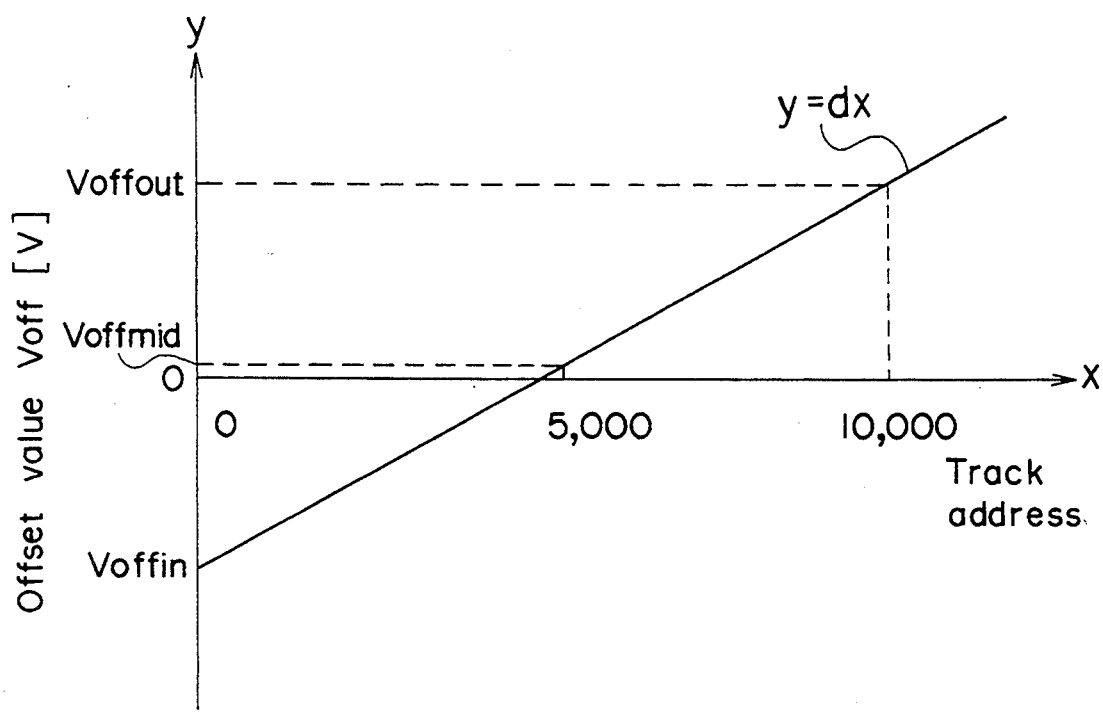
FIG. 14 is a graph of a relationship between an offset value of the tracking error signal and the track address, showing a linear approximate equation of an offset value characteristic on the track address which is used in another preferred embodiment.
Figure 16:
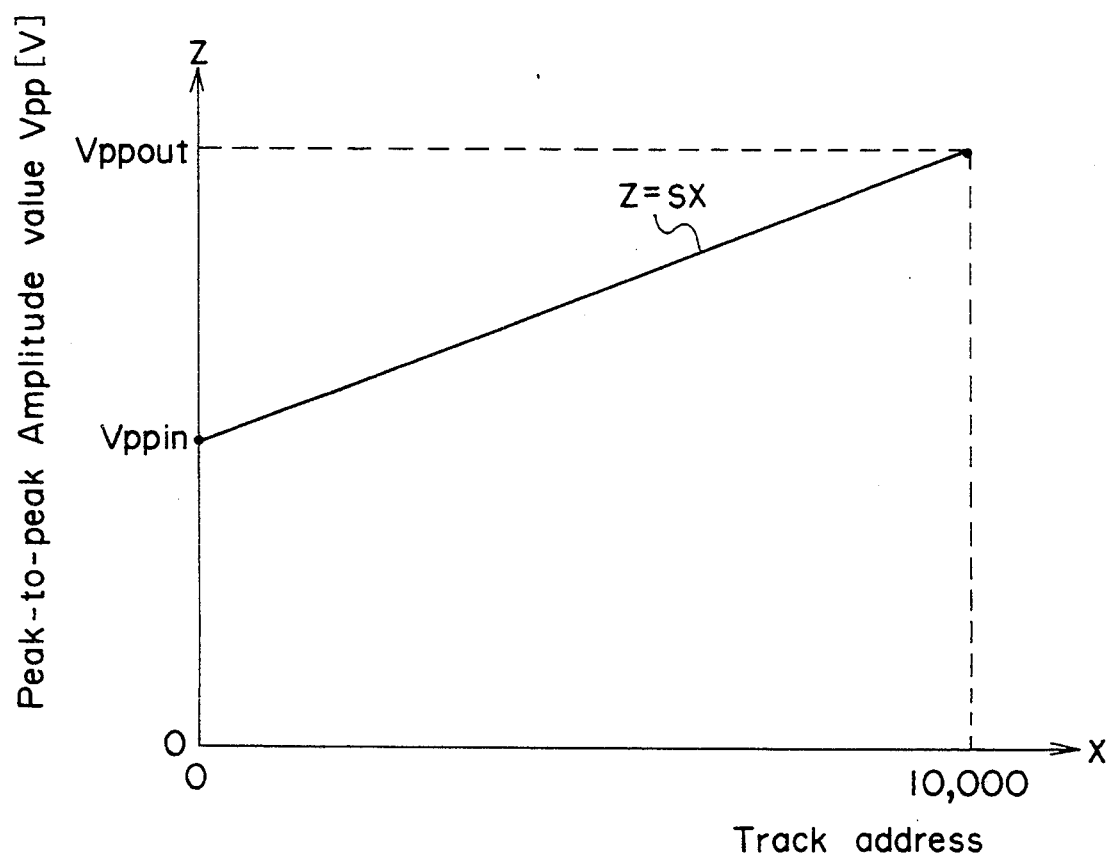
FIG. 16 is a graph of a relationship between a peak-to-peak amplitude value of the tracking error signal and the track address, showing a linear approximate equation of an offset value characteristic on the track address which is used in another preferred embodiment.

In the above-mentioned preferred embodiment, the offset value and peak-to-peak amplitude value characteristics of the tracking error signal on the track address are approximated by a quadratic non-linear equations, respectively, after measuring the offset values and the peak-to-peak amplitude values of the inner, middle and outer adjustment tracks 51 to 53, the present invention is not limited to this. In such a case that the offset value and peak-to-peak amplitude value change according to linear functions, respectively, the offset value and peak-to-peak amplitude value characteristics of the tracking error signal on the track address may be approximated by a linear equations $y=dx$ and $z=sx$, respectively as shown in FIGS. 14 and 16, after measuring the offset values and the peak-to-peak amplitude values of predetermined inner and outer tracks.

Figure 15:
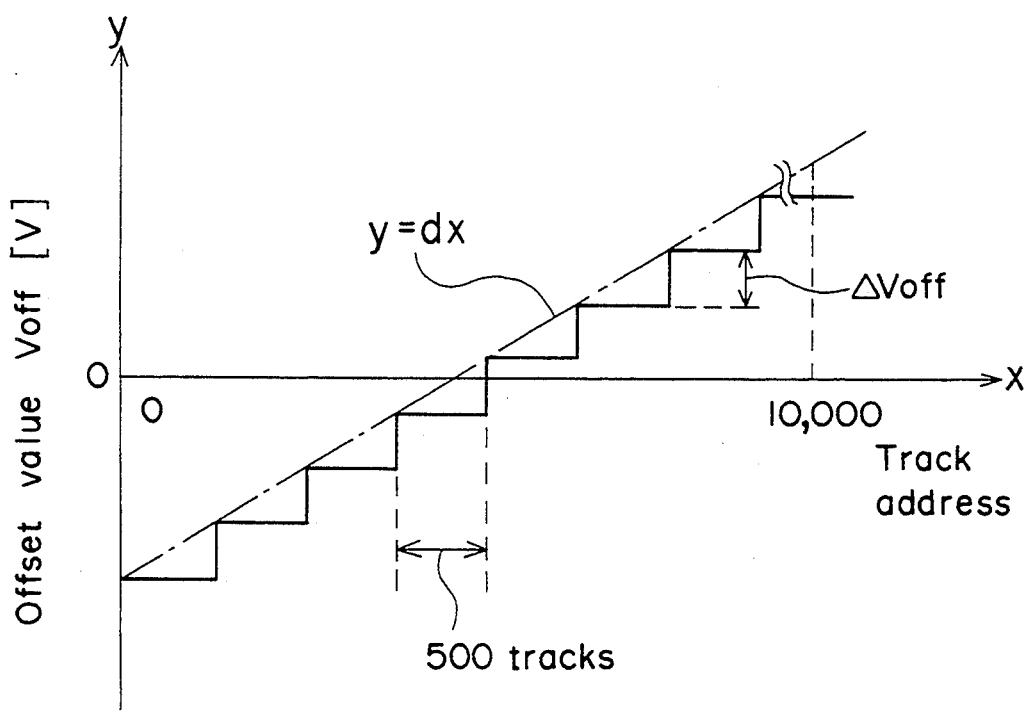
FIG. 15 is a graph of a relationship between an offset value of the tracking error signal and the track address, showing a step-formed approximate equation of an offset value characteristic on the track address which is used in a further modification of the first preferred embodiment.

FIG. 15 is a graph of a relationship between an offset value of the tracking error signal and a track address, showing a step-formed approximate equation of an offset value characteristic on the track address which is used in a modification of the preferred embodiment. This method can be applied to the above-mentioned case shown in FIG. 14 in which the offset value characteristic of the tracking error signal on the track address is approximated by the linear equations $y=dx$, and the offset value Voff is changed in a manner easier than that of the method shown in FIG. 14.

Figure 11:
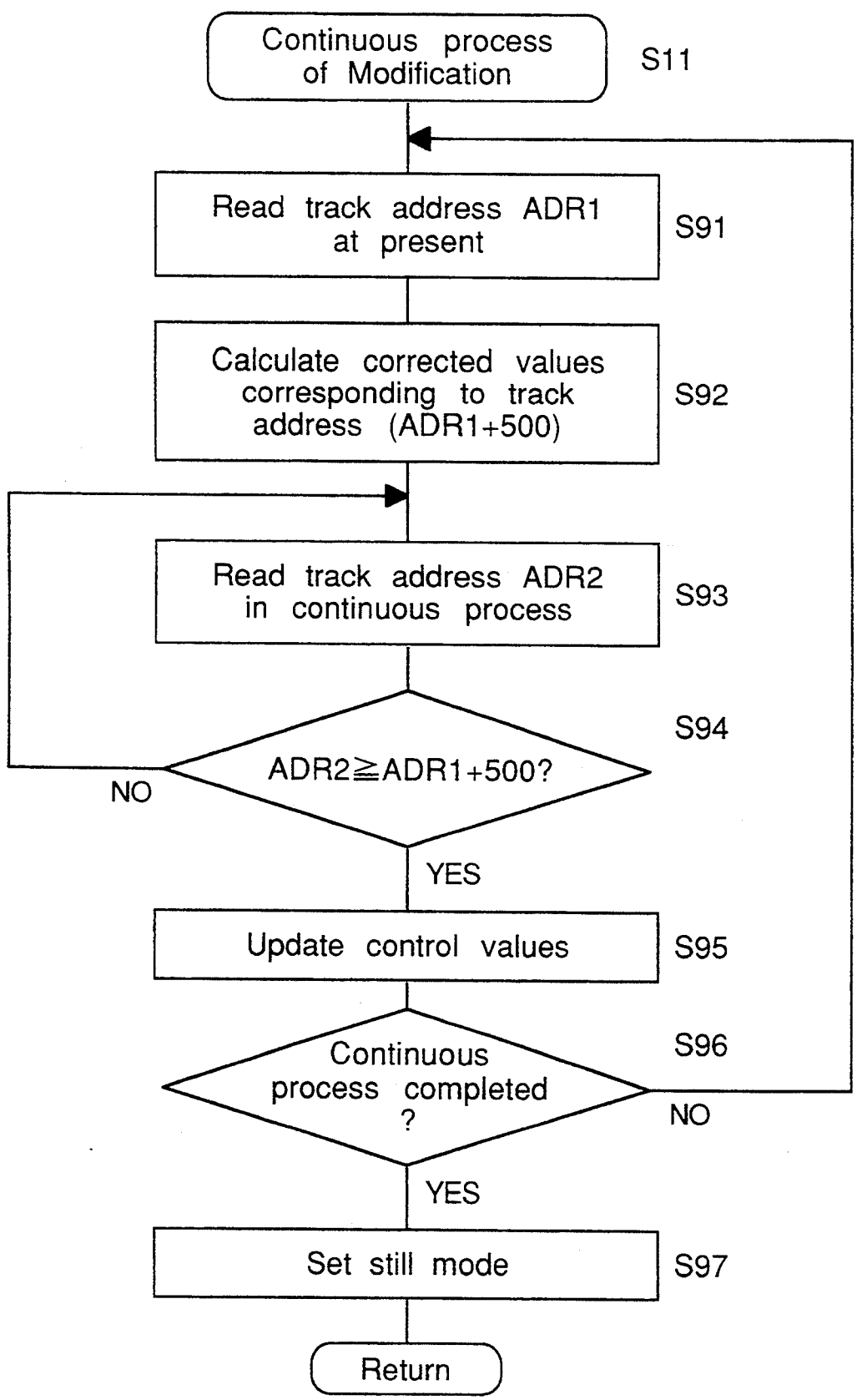
FIG. 11 is a flowchart of another continuous process of a modification of the first preferred embodiment.

FIG. 11 is a flowchart of another continuous process (step S11) of a modification of the first preferred embodiment. In this continuous process, the offset value Voff is changed by 500 tracks according to the linear approximate equation $y=dx$ as shown in FIG. 15.

Referring to FIG. 11, the current track address ADR1 is read out from the prerecorded track address of the disk 7 by receiving the track address data from the address reading circuit 30 at step S91, and then there are calculated at step S92 the corrected offset and amplitude values $y=Voff$ and $z=Vpp$ by substituting the track address $x=ADR1+500$ into linear approximate equations $y=dx$ and $z=sx$, which can be predetermined at step S6, and calculating the values y and z of the approximate equations. Thereafter, the current track address ADR2 on the continuous process is read out from the prerecorded track address of the disk 7 by receiving the track address data from the address reading circuit 30 at step S93, and then it is judged at step S94 whether or not the read track address ADR2 is equal to or larger than the track address (ADR1+500). If ADR2<ADR1+500 (NO at step S94), the program flow goes back to step S93. On the other hand, if ADR2≧ADR1+500 (YES at step S94), the program flow proceeds to step S95.

Then, the control values Voff and Vpp are updated at step S95. That is, the corrected values Voff and Vpp of the current address ADR2 are calculated according to the predetermined linear approximate equations $y=dx$ and $z=sx$. Thereafter, the MPU 32 generates and outputs the tracking offset signal having a level of the corrected offset value Voff through the D/A converter 35 to the combining circuit 19 so as to correct the offset value or the DC level of the normalized tracking error signal, and also generates and outputs to the variable gain type amplifier 17 the gain control signal representing the gain of the variable gain type amplifier 17 which corresponds to the corrected peak-to-peak amplitude value Vpp so as to correct the amplitude of the normalized tracking error signal.

Further, it is judged at step S96 whether or not the continuous process which has been instructed by the seek command has been completed. If the continuous process has not been completed (NO at step S96), the program flow goes back to step S91, and then the processes from step S91 to step S95 are repeatedly executed every track address until the continuous process has been completed. That is, the continuous process of recording, reproducing or erasing process is executed with updating the control values Voff and Vpp in a shape of steps shown in FIG. 15. On the other hand, if the continuous process has been completed (YES at step S96), the still mode is set at step S97, and then the program flow returns to the main routine.

In such a case of using the linear approximate equations, there may be measured the offset values Voff and the peak-to-peak amplitude values Vpp at at least two different points on the track address for each of the approximate equations of the offset value Voff and the amplitude value Vpp.

In the above-mentioned preferred embodiments, the offset value and amplitude value characteristics of the tracking error signal are approximated, respectively, by the linear or quadratic approximate equations, however, the present invention is not limited to this. These characteristics may be approximated by approximate equations each of the fourth degree or more, and then a number of measurement points of the offset value Voff and the amplitude value Vpp increases but the offset value Voff and the amplitude value Vpp can be corrected more precisely than cases of the linear or quadratic approximate equations.

In the case of obtaining an approximate equation, an approximation method such as the method of least squares or the like may be used.

In the above-mentioned preferred embodiment, the track for measuring the offset value Voff and the amplitude value Vpp is preferably set to a non-recorded track of the disk 7 which is used only for the measurement.

SECOND PREFERRED EMBODIMENT

Figure 17:
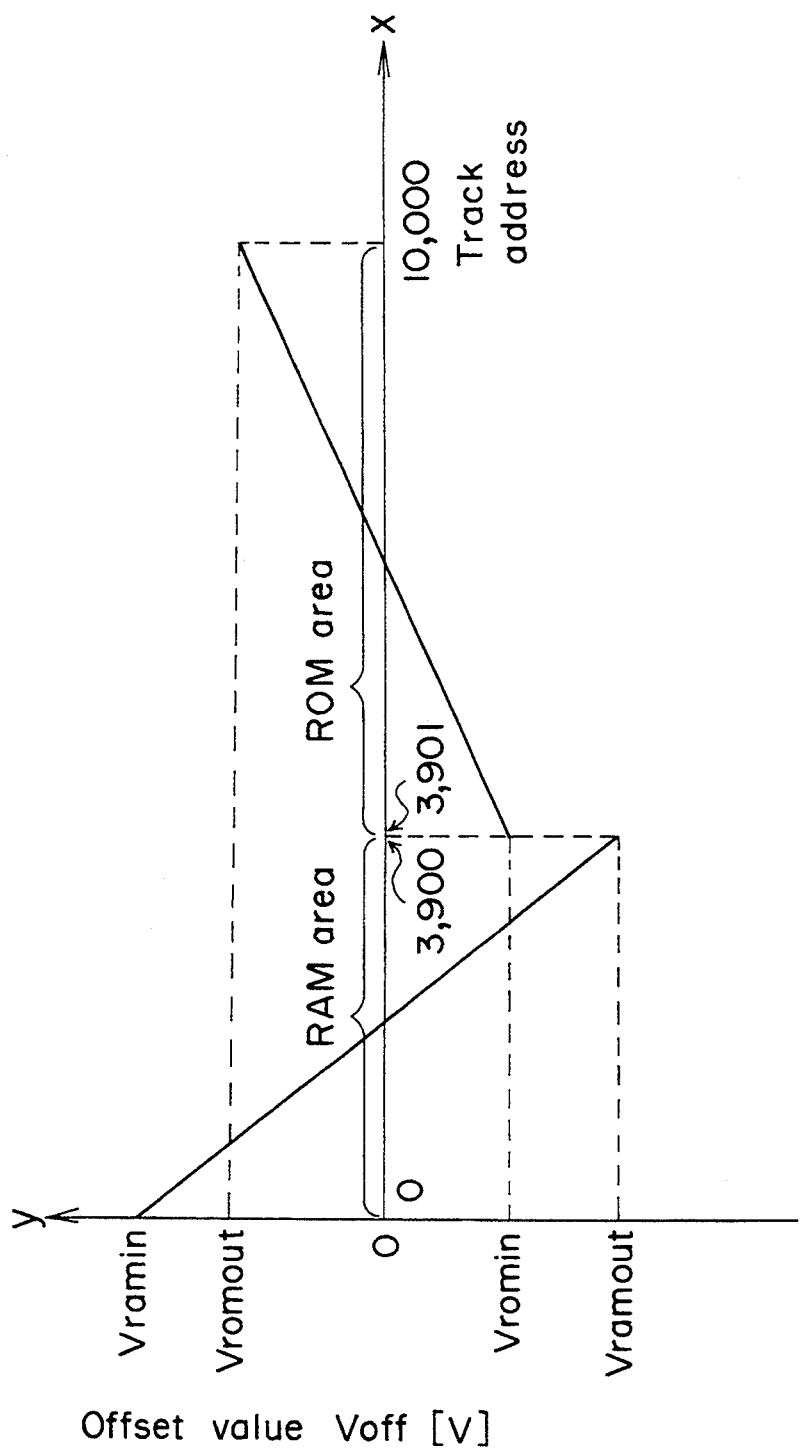
FIG. 17 is a graph of a relationship between an offset value of a tracking error signal and a track address, showing linear approximate equations of offset value characteristics on the track address which are different from each other, which is used in a magneto-optical partial ROM disk of a second preferred embodiment comprising a RAM area and a ROM area.
Figure 18:
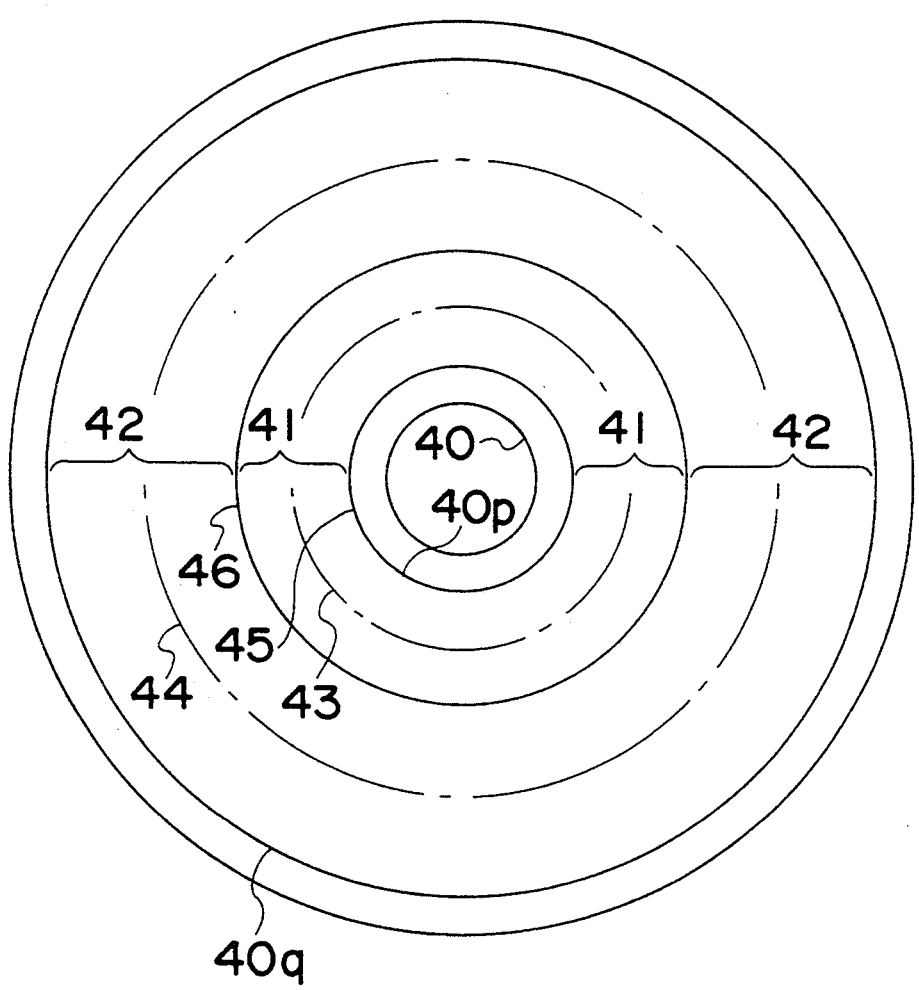
FIG. 18 is a top plan view of a magneto-optical partial ROM disk of the second preferred embodiment comprising a RAM area located in an inner periphery region and a ROM area located in an outer periphery region.

FIG. 18 shows a magneto-optical partial ROM disk of a second preferred embodiment according to the present invention, and FIG. 17 shows linear approximate equations of offset value characteristics on the track address different from each other, which is used in the partial ROM disk.

Referring to FIG. 18, the partial ROM disk comprises a re-writable RAM area 41 located in an inner region and a ROM area 42 located in an outer region and formed with a plurality of pits, wherein the RAM and ROM areas 41 and 42 are divided in a radial direction of the partial disk between an inner periphery 40p and an outer periphery 40q of the partial ROM disk 7. The RAM area 41 comprises not only a control track 45 which is located on the inmost track address 0 of the RAM area 41 and includes information of track addresses 0 to 3,900 of the RAM area 41, but also two adjustment tracks including a first adjustment track located in the beginning track address 1 of the RAM area 41 and a second adjustment track located in the end track address 3,900 of the RAM area 41. Further, the ROM area 42 comprises not only a control track 46 which is located on the inmost track address 3,901 of the ROM area 42 and includes information of track addresses of the ROM area 42, but also two adjustment tracks including a third adjustment track located in the beginning track address 3,902 of the ROM disk 42 and a fourth adjustment track located in the end track address 10,000 of the ROM area 42.

In this case, an offset value Voff characteristic of the tracking error signal on the track address of the RAM area 41 is approximated by a linear approximate equation according to measured offset values Vramin and Vramout as shown in FIG. 17 after measuring the offset values Vramin and Vramout on the first and second adjustment track addresses 1 and 3,900, and then the offset value Voff of the RAM area 41 is corrected based on the obtained linear approximate equation. Further, an offset value Voff characteristic of the tracking error signal on the track address of the ROM area 42 is approximated by a linear approximate equation according to measured offset values Vromin and Vromout as shown in FIG. 17 after measuring the offset values Vromin and Vromout on the third and fourth adjustment track addresses 3,902 and 10,000, and then the offset value Voff of the ROM area 42 is corrected based on the obtained linear approximate equation. Furthermore, a peak-to-peak amplitude value Vpp of each of the ROM and RAM areas 41 and 42 is corrected in a manner similar to that of the offset value Voff.

In the second preferred embodiment, a measured offset value Voffram may be used as an offset value Voff of the RAM area 41 after measuring an offset value Voffram on a predetermined adjustment track 43 located in the middle position in the radial direction of the RAM area 41, and a measured offset value Voffrom may be used as an offset value Voff of the ROM area 42 after measuring an offset value Voffrom on a predetermined adjustment track 44 located in the middle position in the radial direction of the ROM area 42, wherein a signal having a predetermined audio frequency is recorded in each of the adjustment tracks 43 and 44.

Figure 19:
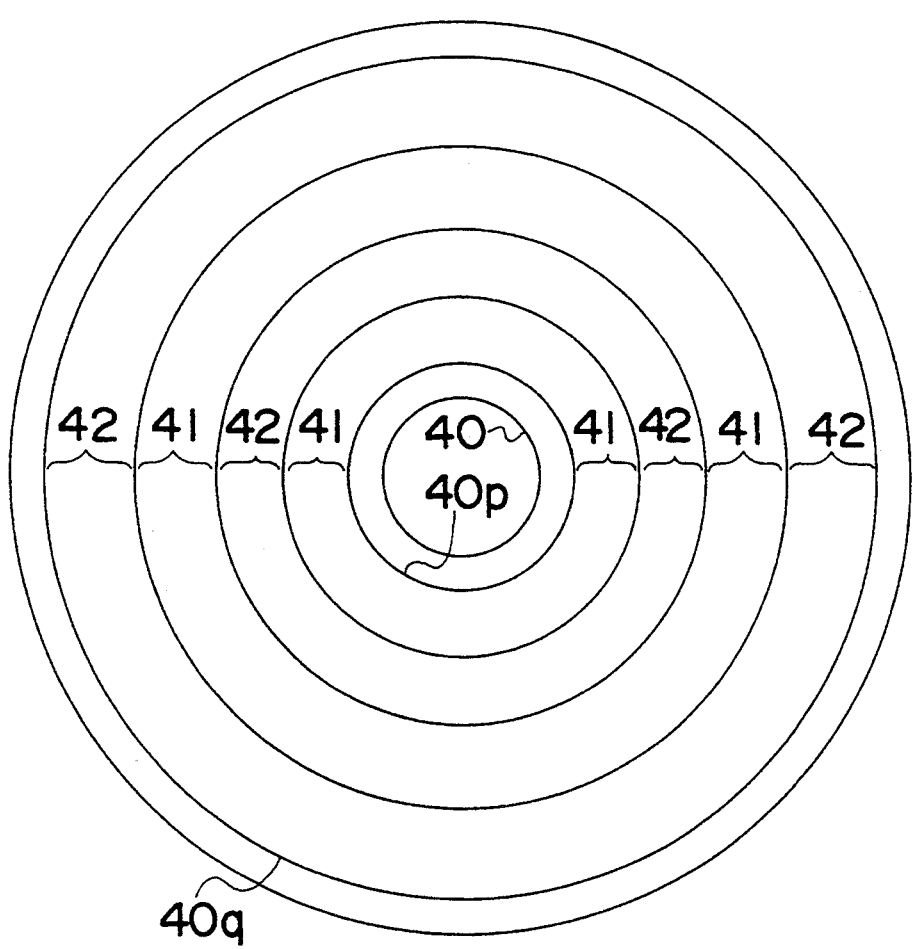
FIG. 19 is a top plan view of a magneto-optical partial ROM disk comprising two RAM areas and two ROM areas.
Figure 20:
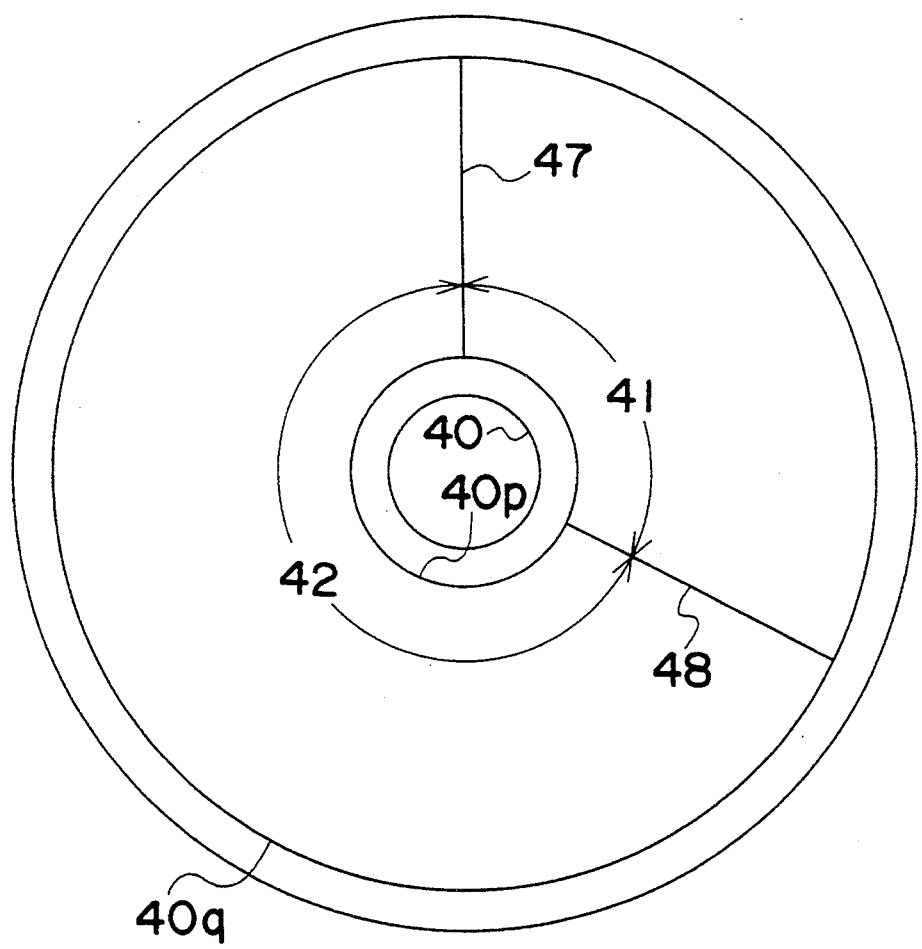
FIG. 20 is a top plan view of a magneto-optical partial ROM disk comprising a RAM area located in a 120° sectorial region and a ROM area located in a 240° sectorial region.

The method of the second preferred embodiment and the modification thereof can be easily applied to the following disks:

(a) a partial ROM disk shown in FIG. 19, comprising a re-writable RAM area 41, a ROM area 42, a re-writable RAM area 41 and a ROM area 42 which are formed so as to be divided in a radial direction of the partial ROM disk between an inner periphery 40p and an outer periphery 40q thereof; and (b) a partial ROM disk shown in FIG. 20, comprising a RAM area 41 located in a 120° sectorial region of the partial ROM disk and a ROM area 42 located in a 240° sectorial region thereof, in which boundary signals are recorded in the two boundary areas 47 and 48 between the RAM and ROM areas 41 and 42. In the partial ROM disk shown in FIG. 20, each of the boundary signals is detected, and then an offset value Voff and a peak-to-peak amplitude value Vpp are measured in respective RAM and ROM areas 41 and 42 in synchronous with the boundary signal. Then, the offset value Voff and the peak-to-peak amplitude value Vpp are updated for respective RAM and ROM areas 41 and 42 in response to or in synchronous with the boundary signal.

According to the above-mentioned preferred embodiments, the offset value Voff and the peak-to-peak amplitude value Vpp are corrected and updated according to approximate equations which respectively represent approximate values of the offset value Voff and the peak-to-peak value Vpp corresponding to each track address of the track. Therefore, there can be detected and precisely corrected the offset value Voff and the amplitude value Vpp of the tracking error signal which may be changed due to an adjustment error in positioning the optical head 5h, a dispersion of disks, a secular change, a difference between circumferences of inner and outer regions of a disk-shaped recording medium, a difference between ROM and RAM areas or the like, thereby correctly recording an information signal into the recording medium and reproducing the recorded information signal therefrom with a high reliability.

In the above-mentioned preferred embodiments, the tracks of the disk 7 are formed in a shape of concentric circles, however, the present invention is not limited to this. The tracks of the disk 7 may be formed in a spiral.

In the above-mentioned preferred embodiments, the magneto-optical disk 7 is used, however, the present invention is not limited to this. There can be used other types of recording mediums having other shapes such as an optical disk or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A tracking control apparatus comprising:

light source means for generating and projecting a beam of light through an optical head onto a disk-shaped recording medium in which a plurality of tracks to be recorded or reproduced are formed in a shape of a spiral or concentric circles;

optical detecting means for detecting a reflected light from said recording medium;

tracking error detecting means for detecting a positional shift of a beam of light projected onto said recording medium from a track to be recorded or reproduced based on said reflected light detected by said optical detecting means, and for generating a tracking error signal having a level of said detected positional shift;

tracking control means for controlling said optical head so that said beam of light scans on said track to be recorded or reproduced based on said tracking error signal generated by said tracking error detecting means;

offset detecting means for detecting direct-current offset values of said tracking error signal on adjustment tracks predetermined among a plurality of tracks of said recording medium;

first approximate function calculating means for calculating coefficients of a predetermined first approximate equation approximately representing an offset value characteristic on said track of said recording medium based on said direct-current offset values detected by said offset detecting means;

offset value calculating means for calculating a direct-current offset value corresponding to said track to be recorded or reproduced based on said first approximate equation with said calculated coefficients; and offset value correcting means for correcting a direct-current offset value of said tracking error signal based on said direct-current offset value calculated by said offset value calculating means.

2. The apparatus as claimed in claim 1, further comprising:
  amplitude detecting means for detecting amplitude values of said tracking error signal on adjustment tracks predetermined among a plurality of tracks of said recording medium;
  second approximate function calculating means for calculating coefficients of a predetermined second approximate equation approximately representing an amplitude value characteristic on said track of said recording medium based on said amplitude values detected by said amplitude detecting means;
  amplitude value calculating means for calculating an amplitude value corresponding to said track to be recorded or reproduced based on said second approximate equation with said calculated coefficients; and
  amplitude value correcting means for correcting the amplitude of said tracking error signal based on said amplitude value calculated by said amplitude value calculating means.

3. The apparatus as claimed in claim 1,
wherein said offset detecting means comprises:
  first jumping pulse generating means for sequentially generating and outputting to said tracking control means, a first pair of jumping pulses for jumping said track from an adjustment track to the next track of said adjustment track;
  first signal detecting means for sequentially detecting maximum and minimum levels of said tracking error signal generated by said tracking error detecting means, respectively, when said first jumping pulse generating means outputs said first pair of jumping pulses;
  second jumping pulse generating means for sequentially generating and outputting to said tracking control means, a second pair of jumping pulses for jumping said track from said next track to said adjustment track;
  second signal detecting means for sequentially detecting minimum and maximum levels of said tracking error signal generated by said tracking error detecting means, respectively, when said second jumping pulse generating means outputs said second pair of jumping pulses; and
  offset average calculating means for calculating an average value of a direct-current offset value of said tracking error signal on said adjustment track based on said maximum and minimum levels detected by said first signal detecting means and said minimum and maximum levels detected by said second signal detecting means, and for setting said calculated average value as said direct-current offset value.

4. The apparatus as claimed in claim 3,
wherein said offset detecting means further comprises repeating means for controlling said first jumping pulse generating means, said first signal detecting means, said second jumping pulse generating means, and said second signal detecting means to repeatedly operate a predetermined plurality of K times, thereby outputting a plurality of K sets of maximum and minimum levels detected by said first signal detecting means and said minimum and maximum levels detected by said second signal detecting means, and
  said offset average calculating means calculates an average value of the direct-current offset value of said tracking error signal on said adjustment track based on said outputted plurality of K sets of maximum and minimum levels detected by said first signal detecting means and said minimum and maximum levels detected by said second signal detecting means, and for setting said calculated average value as said direct-current offset value.

5. The apparatus as claimed in claim 2,
wherein said offset detecting means comprises:
  first jumping pulse generating means for sequentially generating and outputting to said tracking control means, a first pair of jumping pulses for jumping said track from an adjustment track to the next track of said adjustment track;
  first signal detecting means for sequentially detecting maximum and minimum levels of said tracking error signal generated by said tracking error detecting means, respectively, when said first jumping pulse generating means outputs said first pair of jumping pulses;
  second jumping pulse generating means for sequentially generating and outputting to said tracking control means, a second pair of jumping pulses for jumping said track from said next track to said adjustment track;
  second signal detecting means for sequentially detecting minimum and maximum levels of said tracking error signal generated by said tracking error detecting means, respectively, when said second jumping pulse generating means outputs said second pair of jumping pulses; and
  offset average calculating means for calculating a direct-current average value of an offset value of said tracking error signal on said adjustment track based on said maximum and minimum levels detected by said first signal detecting means and said minimum and maximum levels detected by said second signal detecting means, and for setting said calculated average value as said direct-current offset value.

6. The apparatus as claimed in claim 5,
wherein said offset detecting means further comprises repeating means for controlling said first jumping pulse generating means, said first signal detecting means, said second jumping pulse generating means, and said second signal detecting means to repeatedly operate a predetermined plurality of K times, thereby outputting a plurality of K sets of maximum and minimum levels detected by said first signal detecting means and said minimum and maximum levels detected by said second signal detecting means, and
  said offset average calculating means calculates an average value of the direct-current offset value of said tracking error signal on said adjustment track based on said outputted plurality of K sets of maximum and minimum levels detected by said first signal detecting means and said minimum and maximum levels detected by said second signal detecting means, and for setting said calculated average value as said direct-current offset value.

7. The apparatus as claimed in claim 5,
wherein said amplitude detecting means comprises amplitude average calculating means for calculating an average value of an amplitude value of said tracking error signal on said adjustment track based on said maximum and minimum levels detected by said first signal detecting means and said minimum and maximum levels detected by said second signal detecting means, and for setting said calculated average value as said amplitude value.

8. The apparatus as claimed in claim 6, wherein said amplitude average calculating means calculates an average value of the amplitude value of said tracking error signal on said adjustment track based on said outputted plurality of K sets of maximum and minimum levels detected by said first signal detecting means and said minimum and maximum levels detected by said second signal detecting means, and for setting said calculated average value as said amplitude value.

9. The apparatus as claimed in claim 3, wherein said offset detecting means further comprises address reading means for detecting a track address from said recording medium,
said first jumping pulse generating means generates a first pair of jumping pulses in synchronous with said adjustment track address detected by said address reading means, and
said second jumping pulse generating means generates a second pair of jumping pulses in synchronous with the next track address of said adjustment track address detected by said address reading means.

10. The apparatus as claimed in claim 5, wherein said offset detecting means further comprises address reading means for detecting a track address from said recording medium,
said first jumping pulse generating means generates a first pair of jumping pulses in synchronous with said adjustment track address detected by said address reading means, and
said second jumping pulse generating means generates a second pair of jumping pulses in synchronous with the next track address of said adjustment track address detected by said address reading means.

11. The apparatus as claimed in claim 7, wherein said offset detecting means further comprises address reading means for detecting a track address from said recording medium,
said first jumping pulse generating means generates a first pair of jumping pulses in synchronous with said adjustment track address detected by said address reading means, and
said second jumping pulse generating means generates a second pair of jumping pulses in synchronous with the next track address of said adjustment track address detected by said address reading means.

12. The apparatus as claimed in claim 1, further comprising first correcting control means for controlling said offset value correcting means from correcting the offset value of said tracking error signal while inhibiting said tracking control means from operating.

13. The apparatus as claimed in claim 2, further comprising second correcting control means for controlling said amplitude value correcting means from correcting the amplitude of said tracking error signal while inhibiting said tracking control means from operating.

14. The apparatus as claimed in claim 1, wherein said offset value correcting means is for correcting the direct-current offset value of said tracking error signal for a predetermined plurality of tracks.

15. The apparatus as claimed in claim 2, wherein said amplitude value correcting means is for correcting the amplitude of said tracking error signal for a predetermined plurality of tracks.

16. The apparatus as claimed in claim 1, wherein said recording medium comprises at least one re-writable RAM area and at least one ROM area, and
said first approximate function calculating means uses a plurality of approximate equations different from each other depending on respective areas of said RAM and ROM areas.

17. The apparatus as claimed in claim 2, wherein said recording medium comprises at least one re-writable RAM area and at least one ROM area, and
said second approximate function calculating means uses a plurality of approximate equations different from each other depending on respective areas of said RAM and ROM areas.

* * * * *